US010931092B2

(12) United States Patent
Brown et al.

(10) Patent No.: US 10,931,092 B2
(45) Date of Patent: Feb. 23, 2021

(54) DISTRIBUTED CONTROL SYSTEM FOR THERMAL SNOW MELT AND FREEZE PROTECTION SYSTEMS

(71) Applicant: AEF Ice Systems Inc., Durham, NC (US)

(72) Inventors: Alexander F. Brown, New York, NY (US); Travis M. Kuster, Brooklyn, NY (US)

(73) Assignee: AEF Ice Systems, Inc., Durham, NC (US)

( * ) Notice: Subject to any disclaimer, the term of this patent is extended or adjusted under 35 U.S.C. 154(b) by 0 days.

(21) Appl. No.: 16/420,264

(22) Filed: May 23, 2019

(65) Prior Publication Data

US 2019/0360739 A1    Nov. 28, 2019

Related U.S. Application Data

(60) Provisional application No. 62/676,350, filed on May 25, 2018, provisional application No. 62/676,362, filed on May 25, 2018.

(51) Int. Cl.
*E01D 19/00* (2006.01)
*H02G 7/16* (2006.01)
(Continued)

(52) U.S. Cl.
CPC ............. *H02G 7/16* (2013.01); *E01D 19/16* (2013.01); *F25D 21/006* (2013.01); *F25D 21/02* (2013.01);
(Continued)

(58) Field of Classification Search
CPC .......... H02G 7/16; E01D 11/04; E01D 19/16; F25D 21/006; F25D 21/02; F25D 21/08; F25B 2700/11
(Continued)

(56) References Cited

U.S. PATENT DOCUMENTS 6,207,939 B1   3/2001  Allaire et al.
6,682,259 B1   1/2004  Thomas, Sr. et al.
(Continued)

FOREIGN PATENT DOCUMENTS

CA    2802204 A1    7/2014
CN    205443974 U   8/2016
(Continued)

OTHER PUBLICATIONS

International Search Report dated Sep. 16, 2019; International Application No. PCT/US2019/033652; International Filing Date: May 23, 2019; 5 pages.
Written Opinion dated Sep. 16, 2019; International Application No. PCT/US2019/033652; International Filing Date: May 23, 2019; 8 pages.
English translation of Korea Published Application KR20180032299; Publication Date: Mar. 30, 2018; 15 pages.
(Continued)

*Primary Examiner* — Raymond W Addie
(74) *Attorney, Agent, or Firm* — Blank Rome LLP

(57) ABSTRACT

A snow and ice melt system having one or more zones, each including one or more heaters, and having one or more controllers configured to use a power output of each heater and an average temperature of each zone to determine operational control of each heater to achieve a specified result. Hydronic or resistive heaters could be used. The controllers may be configured to use a system temperature response over time to determine if a phase change of the snow or ice is occurring. The phase change might indicate that snow or ice is present on a zone and is melting. Use of a first derivative of the system temperature response over time might determine a percentage of a zone covered by snow or ice. Use of a second derivative of the system temperature response over time might determine whether melting is complete.

24 Claims, 9 Drawing Sheets

(51) Int. Cl.
  *E01D 19/16* (2006.01)
  *F25D 21/00* (2006.01)
  *F25D 21/02* (2006.01)
  *F25D 21/08* (2006.01)
  *E01D 11/04* (2006.01)

(52) U.S. Cl.
  CPC .............. *F25D 21/08* (2013.01); *E01D 11/04* (2013.01); *F25B 2700/11* (2013.01)

(58) Field of Classification Search
  USPC .................................................... 404/71, 72
  See application file for complete search history.

(56) References Cited

U.S. PATENT DOCUMENTS

| | | | |
|---|---|---|---|
| 6,723,971 | B1 | 4/2004 | Petrenko et al. |
| 6,825,444 | B1* | 11/2004 | Tuan ..................... E01C 11/265 14/73 |
| 6,870,139 | B2 | 3/2005 | Petrenko |
| 7,038,125 | B2 | 5/2006 | Petrenko et al. |
| 7,164,100 | B2 | 1/2007 | Petrenko et al. |
| 8,716,634 | B2 | 5/2014 | Biller |
| 9,006,617 | B2 | 4/2015 | Mullen |
| 9,078,292 | B1 | 7/2015 | Mullen |
| 9,345,067 | B2 | 5/2016 | Biller |
| 9,346,550 | B2 | 5/2016 | Gambino et al. |
| 9,512,580 | B2 | 12/2016 | Duncan et al. |
| 10,113,278 | B1 | 10/2018 | Carney |
| 2003/0077121 | A1* | 4/2003 | Chun .................... E01C 11/245 404/71 |
| 2005/0047864 | A1* | 3/2005 | Yamada .................. G01W 1/14 404/71 |
| 2009/0114422 | A1 | 5/2009 | Longatti |
| 2009/0287355 | A1 | 11/2009 | Milder et al. |
| 2011/0250015 | A1* | 10/2011 | Cardoso .................. E01F 9/696 404/71 |
| 2013/0343818 | A1* | 12/2013 | Bandura ............... E01C 11/245 404/71 |
| 2014/0217079 | A1 | 8/2014 | Nelson |
| 2015/0034067 | A1* | 2/2015 | Szekely ................ E01C 11/245 126/271.1 |
| 2016/0032539 | A1* | 2/2016 | Buch ..................... E01C 11/225 404/3 |
| 2016/0138812 | A1 | 5/2016 | Losi |
| 2017/0030039 | A1 | 2/2017 | Perez et al. |
| 2017/0191228 | A1 | 7/2017 | Dong |

FOREIGN PATENT DOCUMENTS

| | | |
|---|---|---|
| CN | 105926442 A | 9/2016 |
| CN | 205741914 U | 11/2016 |
| CN | 108316146 A | 7/2018 |
| CN | 208023412 U | 10/2018 |
| DE | 10337937 A1 | 3/2005 |
| JP | 2006322177 A | 11/2006 |
| JP | 200821483 A | 1/2008 |
| JP | 2008290194 A | 8/2008 |
| KR | 20180032299 A | 3/2018 |

OTHER PUBLICATIONS

Kleissl, K et al.; (2010) "Bridge ice accretion and de- and anti-icing systems: A review." In the 7th Internation Cable Supported Bridge Operators' Conference: Proceedings. (pp. 161-167).

Laursen, Ernst et al.; 2004. The great belt bridge, Denmark: Structural Monitoring. In: the 4th International Cable Supported Bridge Operators' Conference (ICSBOC). pp. 89-98.

Petrenko, Victor.; (2007). Ice adhesion and ice friction modification using pulsed thermal power. Dartmouth College.

Petrenko, Victor et al.; (2011). "Pulse electro-thermal de-icer (PETD)." Cold Regions Science and Technology. 65.70-78.10.1016/j.coldregions. 2010.06.002.

Nims, Douglas et al.; (2014). "Ice prevention or Removal on the Veteran's Glass City Skyway Cables" Final Report. Ohio Department of Transportation Office of Research and Development, State Job No. 134489.

Nims, Douglas et al; (2014). "Ice Prevention or Removal on the Veteran's Glass City Skyway Cables" Executive Summary. Ohio Department of Transportation Office of Research and Development, State Job No. 134489.

Mirto, Clinton J.; "A sensor for ice monitoring on bridge superstructures." (2015) Theses and Dissertations. paper 1855.

Likitkumchorn, Nuhavit: (2014). "Ice prevention and Weather monitoring on cable-stayed bridges", Theses and Dissertations. 1750. M.S. Thesis Paper—University of Toledo.

English translation; China Publication No. CN105926442; Publication Date: Sep. 7, 2016; 7 pages.

English translation; China Publication No. CN205741914; Publication Date: Nov. 30, 2016; 4 pages.

English translation; Japan Publication No. JP2006322177; Publication Date: Nov. 30, 2006; 6 pages.

English translation; Japan Publication No. JP2008021483; Publication Date: Jan. 31, 2008; 5 pages.

Eiche, Michael; "System Failure Case Study—Ice Falling from Port Mann Bridge Cables"; www.engineeringnewworld.com; Dec. 22, 2016; 4 pages.

Meiszner, Peter; Port Main Bridge Dec. 20, 2013; "Ice bomb prevention system"; https://globalnews.ca/news/1044434/port-mann-bridge-ice-bomb-prevention-system-debuts-during-todays-snowy-weather/; 1 page.

International Search Report and Written Opinion dated Sep. 22, 2019; International Application No. PCT/US2019/033658; International Filing Date: May 23, 2019; 8 pages.

English translation; Japanese Published Application No. JP2008190194; Publication Date: Aug. 21, 2008; 9 pages.

English translation; Chinese Published Application No. CN108316146; Publication Date: Jul. 24, 2018; 12 pages.

English translation; Chinese Published Application No. CN208023412; Publication Date: Oct. 30, 2018; 7 pages.

English translation: German Published Application No. DE10337937; Publication Date: Mar. 24, 2005; 16 pages.

English translation; Chinese Published Application No. CN205443974; Publication Date: Aug. 10, 2016; 7 pages.

* cited by examiner

DISTRIBUTED CONTROL SYSTEM FOR THERMAL SNOW MELT AND FREEZE PROTECTION SYSTEMS

RELATED APPLICATIONS

This application claims benefit of priority of: U.S. Provisional Application No. 62/676,350, filed May 25, 2018; and U.S. Provisional Application No. 62/676,362, filed May 25, 2018. Each of the above-identified related applications are incorporated herein by reference.

FIELD OF THE INVENTION

The present invention relates generally to thermal snow melt and freeze protection methods and systems; and more particularly to distribution control systems directed thereto, a methods and systems providing anti-icing, de-icing, and/or intermittent de-icing of surfaces and structures.

BACKGROUND OF THE INVENTION

Snow and ice accretes on surfaces and structures in cold climates. Such accretions can cause damage to property, cause injury, or adversely alter the dynamics of a system. For example, accretions on elevated surfaces may fall off in an uncontrolled manner resulting in a hazard to whatever lies below. Accretions on surfaces such as roads, driveways, sidewalks, and the like may cause vehicles or pedestrians to crash, slip, or fall. Accretions on structures may cause unsafe loads on structural members or cause freezing or temperature reduction in pipes or ducts carrying fluids. Furthermore, ice dams may form on the eaves of sloped roofs, causing melt water to back up behind the ice dam and leak into the roof and walls of the building, resulting in structural damage and mold problems.

Various techniques are available for performing de-icing, snow removal, and freeze protection in residential and commercial applications on roofs, driveways, gutters, pipes, and other ice-prone areas to prevent damage and increase safety. Known techniques include physical removal, such as by scraping or shoveling, or melting, such as by the application of heat or chemical agents.

Thermal snow melt and freeze protection systems are generally thermoelectric or hydronic. Thermoelectric systems may use a resistive heating element, such as heat trace cable or silicone heating mats. Hydronic systems pump steam or heated fluids through a series of pipes.

Some thermal systems are switched on for the entire winter or longer. Other systems are run by a controller that switches the system on and off according to some simple control methodology. Conventional controllers generally include a thermostat, temperature sensors, snow sensors, or some combination thereof. Thermostat controllers typically have a setpoint of 40° F. as measured by a temperature sensor in air or attached to a surface. Many areas experience temperatures below this setpoint when there is little to no precipitation over a period. This causes the system to run unnecessarily, wasting energy and placing wear on system components.

Some systems rely on surface or gutter-mounted snow presence sensors to activate the system. These sensors may consist of a moisture sensor, a temperature sensor, and a heater to melt incoming precipitation. The sensor indicates the presence of snow/ice when moisture is sensed and the temperature is below some threshold, often 40° F. A snow/ice sensor may be falsely or unnecessarily triggered by rain below the threshold temperature, as well as drifting snow, standing water, or water dripping from nearby surfaces. Snow sensors may require installation by a professional, modification of the sensed surface and may be visually unappealing.

SUMMARY OF THE INVENTION

The invention is a thermal ice mitigation system and method for surfaces and structures including heated zones, each including one or more heaters, connected to an electrical distribution system that is monitored and operated by a control system. The method and system can be designed to reduce snow and ice buildup on the surfaces or structures by either melting any incoming precipitation on contact (anti-icing) or by melting buildup at some interval (intermittent de-icing). Each surface or structure may be divided into heated sections, or zones, to allow each section, or zone, to be controlled independently. Each independent section may deliver only the required amount of thermal energy to melt the incoming precipitation (in anti-icing mode), or to melt or shed the buildup on that section (in intermittent de-icing mode). A sectioned heating system takes advantage of the fact that both heat loss to convection and the thermal energy required to melt/prevent snow and ice buildup vary, about the surface or structure. In a sectioned heating system, areas with more buildup may use more heat than areas with little or no build up, and a structure with independently controlled sections can more efficiently mitigate an entirety of the structure.

Accordingly, a control method and system of the present invention operates one or more heaters of every zone in such a way that overall energy use, and dangerous snow and ice buildup across the entirety of a structure, are minimized. One or more controllers may use temperature sensing to determine if snow is present on each heated zone. The controllers can also be set to cap the electrical output at a certain level to reduce the total system demand. In the case where total output is capped, the system can distribute power to more problematic areas first. For example, areas situated to have the greatest risk of falling snow and ice, to persons located below or thereabout, can be prioritized. Under limited power conditions, these areas can be melted first. The methods and systems of the present invention will then move to lower priority, less problematic areas. The risk of falling snow and ice is a product of the time an accretion is in place and the likelihood that the falling accretion will cause damage. Overall risk can be minimized by targeting (i.e. heating) the highest risk areas first.

In one embodiment, a snow and ice mitigation system includes one or more zones, each including one or more heaters, and one or more controllers configured to receive a power output of each heater, to receive an average temperature of each zone, and to use the power output of each heater and the average temperature of each zone to determine operational control of each heater to achieve a specified result regarding snow or ice mitigation in each zone.

In one aspect of this embodiment, the one or more heaters are part of a hydronic heating system. Here, the one or more controllers are further configured to determine an average temperature of each zone, and to determine the power output of each heater using a working fluid of the respective heater. In this aspect, the average temperature of each zone can be a weighted average of at least two temperature sensors in a heating loop of the hydronic heating system, where a differential is used to establish a temperature gradient through the heating loop to determine the average temperature of each zone. The power output from the heated zone can be measured as the energy input into the working fluid, where the efficiency of the system could be assumed constant. The power output from the heated zone could also be determined using a volumetric flowrate of the working fluid (V), a temperature of the fluid at an outlet to the heated zone ($T_{OUT}$), and a temperature of the fluid at an inlet from the heated zone ($T_{IN}$).

In another aspect, the one or more heaters are part of a resistive heating system. Here, the power output of each heater can be assumed constant, with one or more of the heaters operating less than 100% of the time. In this aspect, the one or more controllers are further configured to determine an effective power output of each zone over a period of time by a multiplication of the power output of each heater in the respective zone by the time each heater was on, during the period, and then by a division by a total time of the period.

In a further aspect, the one or more heaters are part of a resistive heating system, and the one or more controllers are further configured to determine a power output of each zone by a multiplication of a current of the one or more heaters in the respective zone by a voltage of the system.

In another aspect, one or more single point temperature sensors can be used to determine the average temperature of the heated zone. Further, a voltage sensor can be used to increase an accuracy of the determined power output of each heater, or heated zone.

In a still further aspect, the one or more heaters are part of a resistive heating system, and the one or more controllers are further configured to a determine a resistance of each heater $R_H$ using the equation $$R_H = \frac{V_H}{I_H},$$

where $I_H$ is a current of each heater and $V_H$ is a voltage of each heater, where the resistance of each heater $R_H$, which is proportional to temperature throughout an operating temperature range, is used as a proxy for the average temperature of each zone.

In another embodiment, the one or more controllers are further configured to use a system temperature response over time, at a constant power output sufficient to produce heating, to determine if a phase change of the snow or ice is occurring in the system. Here, a phase change can indicate that snow or ice is present on a zone and the snow or ice is melting.

In one aspect of this embodiment, the one or more controllers are further configured to use a first derivative of the system temperature response over time to determine a percentage of a zone covered by snow or ice. The first derivative of the system temperature response over time could be used together with one or more baseline tests to determine the percentage of the zone covered.

In another aspect, the one or more controllers are further configured to use a second derivative of the system temperature response over time to determine whether snow or ice is present in a zone and whether melting is complete.

In a further aspect, the one or more controllers are further configured to further use weather data, with the system temperature response over time, to determine if a phase change of the snow or ice is occurring in the system, the weather data accounting for non-precipitation related ambient conditions that affect the system temperature response over time. This could increase a likelihood of accuracy of the phase change determination. In addition, the temperature response could be compared to a baseline temperature response, with similar ambient conditions and no snow or ice present, to determine if snow or ice is present and whether melting is occurring.

In a further embodiment, the one or more controllers are further configured to hold constant the average temperature of a zone, at some temperature above 0° C., sufficient to produce melting in the zone; and to record the power output of the heater. Here, the power output is considered a measurement of storm intensity. In addition, the measurement of storm intensity may be combined with ambient weather information to account for non-precipitation heat loss factors (e.g., sun, wind, ambient temperature) to determine if melting is occurring, and if snow is present, in the zone. Alternatively, the measurement of storm intensity can be combined in a model with the ambient weather information to account for the non-precipitation heat loss factors.

In a still further embodiment, the one or more controllers are further configured to receive ambient weather information, and to use the ambient weather information to adjust control parameters and to change operational control of each heater to account for varying storm intensity.

In one aspect of this embodiment, the one or more controllers are further configured to combine the ambient weather information with a baseline model of system behavior to preheat one or more heaters such that melting occurs in a respective zone at an onset of precipitation.

In another aspect, the ambient weather information includes current storm precipitation totals; and the one or more controllers are further configured to combine the ambient weather information with a baseline model of system behavior to determine a period of time, after a storm concludes, that one or more heaters will continue to operate. This will more efficiently melt any remaining snow or ice on a zone after the storm concludes.

In another embodiment, where multiple zones are controlled by a single central control system, including one or more controllers, the central control system is configured to algorithmically and individually direct power to each heater in the multiple zones to limit total central control system heating power output. Here, the total central control system heating power output can be maintained below a predetermined total power capacity limit or can be operated at an algorithmically determined power output level factoring storm intensity and a predetermined efficiency factor. Alternatively, the central control system might direct a cycling of power to each heater, or to only one or more selected heaters, either randomly, in a prioritized order, or based upon other algorithmic factors, to effectively melt snow and ice in each zone at some interval.

In still another embodiment, where multiple zones are controlled by a single central control system, including one or more controllers, the central control system configured to determine, by a cycle of sensing, whether snow or ice is present on each of the multiple zones; direct heat, in one or more melt cycles, to only zones where snow or ice is determined to be present; and remove, from the one or more melt cycles, any zone, previously determined to have snow or ice present, now determined to not have snow or ice present thereon.

In a further embodiment, a method for controlling a snow or ice mitigation system is provided, where the system might include one or more controllers communicating with a network, where the one or more controllers are configured to control one or more heaters of the system. Also included is a processing engine associated with, and communicating with, the network, the processing engine configured to determine control parameters of the system. In this embodiment, the method might include the steps of receiving, by the processing engine, weather data directed to a location associated with the system; determining, by the processing engine, whether a storm with frozen precipitation intensity above a predetermined threshold is likely to occur in the location; and determining, by the processing engine, control parameters for the one or more controllers, based upon the frozen precipitation intensity above a predetermined threshold determination, to achieve a specified result regarding snow or ice mitigation in the location.

In one aspect, the system might further include sensors communicating with the one or more controllers, where the method further includes the steps of receiving, by the processing engine, data from the sensors; and determining, by the processing engine, control parameters for the one or more controllers, based additionally upon the data from the sensors. In this aspect, the data from the sensors might include current measurements, and the network might store model data or historical data, where the method might further include comparing, by the processing engine, current measurements with model data or historical data; and determining, by the processing engine, whether an operational state of the system is outside predetermined bounds by detecting, using the comparing, system faults, anomalies, or temporal changes.

In another aspect, the method might further include monitoring, by the processing engine, of forecasted weather data directed to the location; and initiating operation of one or more heaters of the system at a predetermined time before a storm begins at the location to preheat the one or more heaters. In this aspect, any accumulation of snow or ice can be prevented.

In a further aspect, the method might further include monitoring, by the processing engine, an intensity of a precipitation event throughout a duration of the precipitation event, using the weather data directed to the location; and determining, by the processing engine, a period of time, after the precipitation event ends, to continue operating one or more heaters. In this aspect, any snow or ice remaining after the precipitation event ends would be efficiently removed, without an unnecessarily long period of after-event heating.

In a still further aspect, the method might further include monitoring, by the processing engine, of forecasted weather data directed to the location; and determining, by the processing engine, whether natural melting is likely to occur within an acceptable, predetermined interval of time after an end of a precipitation event; and delaying or shifting, by the processing engine, a timing of activation of one or more heaters, depending upon the determining of a likelihood of natural melting. Here, the acceptable, predetermined interval of time could factor an anticipated schedule of use of the respective location.

In another aspect, the network stores third party information such as real time electricity pricing or information from a grid operator, and the method further includes monitoring and analyzing, by the processing engine, of forecasted weather data directed to the location and the third party information; and delaying or shifting, by the processing engine, a timing of activation of one or more heaters, whereby performance of the system is efficiently optimized relative to the third party information.

In a still further embodiment, a method for controlling a snow or ice mitigation system is provided, where the system might include one or more controllers, located at a system level, communicating with a network, the one or more controllers configured to control one or more heaters of the system. Also included is a processing engine located at a network level, communicating with the system, the processing engine configured to determine control parameters of the system. In this embodiment, the method might include the steps of receiving, by the processing engine, information selected from the group consisting of weather data directed to a location associated with the system, model data, historical weather data of one or more locations, historical operational data of one or more systems, and historical operational data of one or more systems relative to respective historical weather data; analyzing, by the processing engine, the information; developing, by the processing engine, a control algorithm specific for the system based upon the analyzing; and transferring the control algorithm to the one or more controllers at the system level for use by the system, together with at least sensor data local to the system, to control, independent of the network level, the one or more heaters of the system.

In another embodiment, the present invention provides just control circuitry for controllers, or just a computer-readable medium (CRM) with instructions, and/or various other necessary components, directed to controlling operation of a thermal ice mitigation method or system for surfaces and structures (e.g., where sectioned (or zoned) heaters might already exist on a surface or structure). For example, the control circuitry may include, and/or the present invention may alternatively involve, just a processor and/or a computer-readable medium (CRM) capable of executing program instructions to perform any of the methodology, system functionality and/or algorithms described above, or as further detailed below.

In addition, where embodiments and/or aspects of the present invention are summarized above, or are further detailed below, in a system or apparatus environment (e.g., apparatus claims), it is understood that the invention equally includes the components and/or functionality articulated therein in a method environment (e.g., method claims), and vice versa.

BRIEF DESCRIPTION OF THE ILLUSTRATED EMBODIMENTS

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

DETAILED DESCRIPTION OF THE ILLUSTRATED EMBODIMENTS

Figure 1:
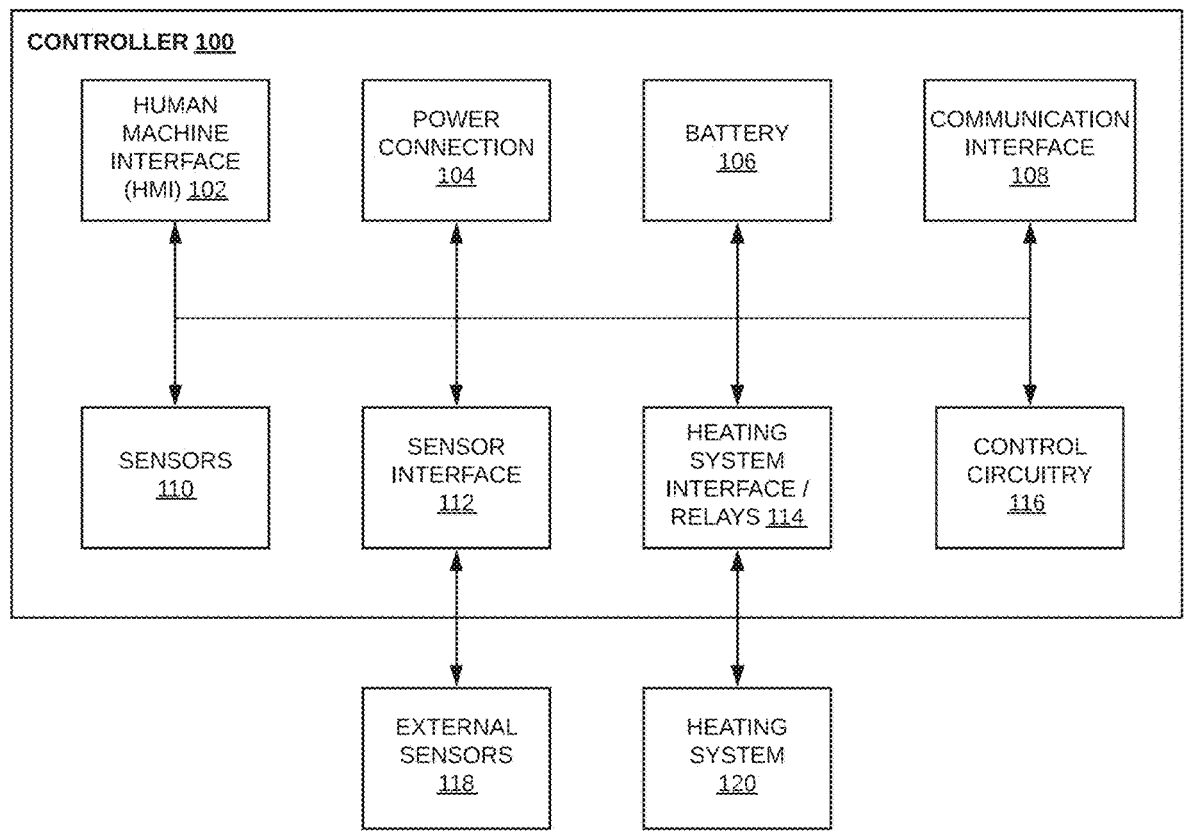
FIG. 1 illustrates an example of an intelligent, network-connected controller.

Referring now to the drawings, wherein like numerals indicate like elements, there is shown in FIG. 1 a smart controller.

FIG. 1—Smart Controller (Full)

Summary—

As described further herein, one or more intelligent, network-connected devices can be used to promote safety, functionality, and/or cost/energy savings in snow melt and freeze protection systems. FIG. 1 illustrates an example of general device components which can be included in an intelligent, network-connected controller 100 (i.e. "controller"). Each controller 100 within a system of controllers can include a human-machine interface 102, a power supply (e.g. including a power connection 104 and/or a battery 106), a communication interface 108, one or more sensors 110, a sensor interface 112, a heating system interface 114 (e.g. one or multiple relays), and control circuitry 116. External sensors 118 may be connected to the controller via the sensor interface 112. A heating system 120 may be connected to the controller via the heating system interface 114.

Human-Machine Interface—

One or more human-machine interface (HMI) components 102 in controller 100 may be configured to present information to a user via a visual display (e.g. an LED display) and/or an audio speaker. Human-machine interface components 102 may also include one or more user-input components to receive information from a user, such as a touchscreen, keypad, button, scroll wheel, switch, microphone, camera or another component. Additionally, a user may interface with the controller 100 via a device that is temporarily or permanently connected to the controller, either wired or wirelessly, via the communication interface 108 or the sensor interface 112.

Power Supply—

A power supply component in controller 100 may include a power connection 104 and/or battery 106. For example, power connection 104 can connect controller 100 to a power source such as a line voltage source. This power connection may be via a power cord and plug that interfaces with an electrical outlet or may be hardwired into an electrical circuit or circuit breaker. In some instances, power connection 104 to an AC/DC power source can be used to repeatedly charge a rechargeable battery 106, such that battery 106 can later be used as a power supply if needed in the event of a loss of sufficient AC/DC power. The power connection 104 may include circuitry (e.g. an AC-DC converter) to convert the input power to be compatible with the internal components of controller 100 and/or heating system 120 and/or external sensors 118. The power connection 104 may also include safety components such as Ground Fault Circuit Interrupt (GFCI), Ground Fault Equipment Protection (GFEP), fuses, and/or circuit breakers.

Communication Interface—

A communication interface 108 in controller 100 can include components that enable controller 100 to communicate with one or multiple local or remote devices, such as another master or slave controller, a communication hub, an external human-machine interface, a computer, a server, or any other compatible device. Communication interface 108 can allow communication via, e.g., Wi-Fi, wired Ethernet, 3G/4G wireless or other wireless standard, Bluetooth, HomePlug or other powerline communications method, radio frequency, telephone, or fiber optics, by way of non-limiting examples. Communication interface 108 can include a wireless chip or card, physical plug, or some other transceiver connection. Communication interface 108 may communicate (e.g. send data, receive data, receive firmware updates, etc.) with a cloud application as described herein.

Sensors—

By way of non-limiting example, one or more internal sensors 110 or external sensors 118 in communication with a controller 100 may be able to, e.g., detect acceleration, temperature, voltage, current, electrical power, humidity, water, supplied power, proximity, altitude, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 110 and external sensors 118 can include temperature sensor(s), humidity sensor(s), altimeter(s)), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). A controller 100 may include a single sensor or multiple sensors 110 and may be connected to or in communication with a single sensor or multiple sensors 118. In general, controller 100 may include one or more primary sensors and may also include one or more secondary sensors. The primary sensor(s) can sense data central to the core operation of the device, e.g. temperature or power output of the heating system 120. The secondary sensor(s) can sense other types of data (e.g., precipitation, wind, light, or sound), which can be used to improve control algorithms and provide the control network with additional information. In some instances, an average user may be unaware of an existence of a secondary sensor.

Sensor Interface—

A sensor interface 112 in controller 100 can include components that enable controller 100 to communicate with one or multiple external sensors 118 of any type described above. Sensor interface 112 may contain different components and/or circuitry as well as different connection and/or plug types depending on the type of external sensor(s) 118.

Heater System Interface—

Heating system interface 114 can include components that switch or modulate power to the external heating system 120. A heating system interface 114 may consist of one or more relays, e.g. a solid-state relay (SSR), and one or multiple components or circuits required to drive the relay(s), such as Darlington transistors, discrete transistors, and/or switches, by way of nonlimiting examples. Heating system interface 114 may include one or more plugs, terminals, terminal blocks, connectors, or other means of electrically connecting to the heating system 120.

Control Circuitry—

Control circuitry 116 of controller 100 can contain components for directing operation of the heating system 120 and processing signals from and communicating with the human-machine interface 102, heating system interface 114, sensor interface 112 and sensors 110, and other communication interfaces 108. Control circuitry 116 may include, for instance, a processor and a computer-readable medium (CRM). The processor may include any processor type capable of executing program instructions in order to perform the functions and algorithms described herein. For example, the processor may be any general-purpose processor, specialized processing unit, or device containing processing elements. In some cases, multiple processing units may be connected and utilized in combination to perform the various functions of the processor. An example CRM may be any available media that can be accessed by the processor of control circuitry 116 and any other computing, processing, or communication elements in controller 110 or a network of controllers described herein. By way of example, the CRM may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by the processor. When information is transferred or provided over a network or another communications connection (either hardwired, wireless, or a combination of hardwired and wireless) to a machine, the machine properly views the connection as a CRM. Thus, any such connection to a computing device or processor is properly termed a CRM. Combinations of the above are also included within the scope of computer-readable media. Program instructions stored on the CRM may include, for example, instructions and data capable of causing a processing unit, a general-purpose computer, a special-purpose computer, special-purpose processing machines, or server systems to perform a certain function or group of functions. In other cases, one or multiple dedicated integrated circuits or special-purpose processors may process input command signals and output result signals that each element receives/transmits as part of the functions described herein. The control circuitry 116 can furthermore be implemented as localized versions or counterparts of algorithms carried out or governed remotely by servers or cloud-based systems.

By way of example, control circuitry 116 may be configured to process weather data from a cloud server or weather API (e.g. wunderground.com or darksky.net) to determine when to activate and deactivate the heating system 120. As another example, the control circuitry 116 may be configured to transmit raw or processed local sensor readings from sensors 110 and/or external sensors 118 to a cloud server, where these readings can be stored, analyzed, and used to send control signals back to controller 100, causing it to activate or deactivate the heating system 120 based on a cloud-based algorithm.

Heating System—

Heating system 120 consists of one or more heating elements in thermal communication with a surface for snow-melting, de-icing, anti-icing, snow shedding, or otherwise modulating the temperature of the surface to mitigate or control unwanted environmental conditions, for example, to prevent condensation or maintain a set process temperature (i.e. pipe freeze protection). Exemplary heating systems are discussed further below. A heating system 120 may consist of one or more heating circuits that may be controlled separately or together.

Modularity—

All or some of the components and subsystems of controller 100 may be constructed such that they are modular and/or replaceable. Thus, individual components may be upgraded and/or additional functionality may be added to controller 100 without replacing the entire unit.

Plug-in Controller

A heating system interface 114 of controller 100 may contain an electrical receptacle, such as a NEMA 1-15R or NEMA 5-15R receptacle, by way of non-limiting example, such that a heating system with the corresponding plug may be connected directly to controller 100. For example, electrical heat trace may be terminated directly in an electrical plug such that it may be connected directly to a wall outlet. This heat trace may instead be plugged directly into a controller 100 which is in turn plugged directly into a wall outlet or otherwise connected to power. In doing so, the plug-in heat trace system may be switched on/off by relays in the heating system interface 114 according to standalone or networked algorithms in the control circuitry 116. Similarly, the power connection 104 of controller 100 may contain an electrical plug (e.g. a NEMA plug) such that controller 100 may be plugged directly into a wall outlet.

Existing Controller with Networked Integrated Circuit or Microprocessor

A microprocessor or integrated circuit with some or all the functionality of a controller 100 may be integrated with an existing controller (i.e. an existing controller design from an existing manufacturer) such that the existing controller gains additional capabilities described herein.

Figure 2:
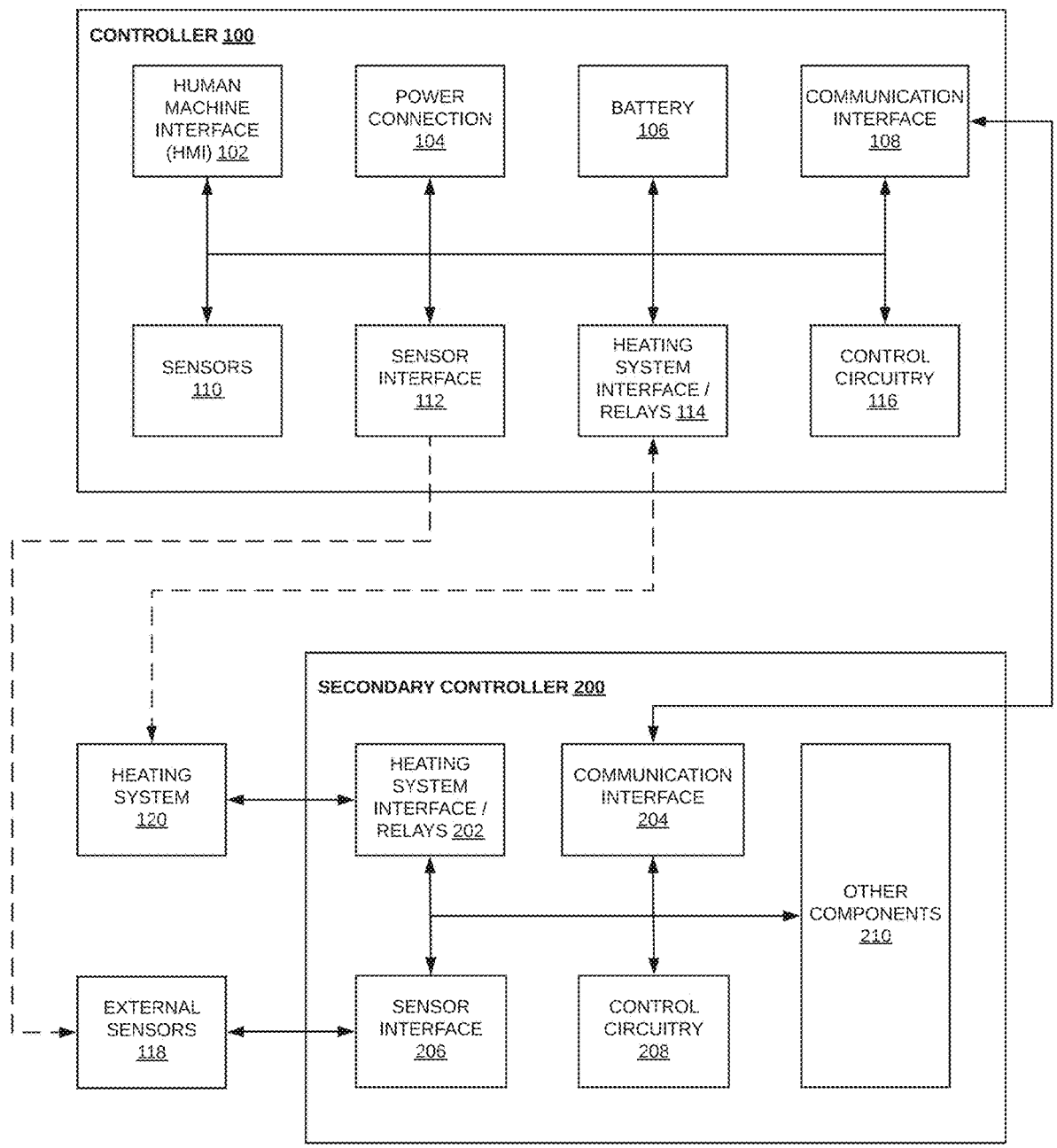
FIG. 2 illustrates an example of an intelligent, network-connected controller system consisting of a primary and secondary controller.

FIG. 2—Primary and Secondary Controller Configuration

FIG. 2 illustrates another embodiment of an intelligent, network-connected control system where a primary controller 100 is connected to a secondary controller 200. The secondary controller 200 may contain a heating system interface 202, a communication interface 204, a sensor interface 206, control circuitry 208, and any other components 210 of controller 100 that are not expressly described in FIG. 2. The controller 100, described above, and secondary controller 200 may be connected via the communication interface 108 of controller 100 and the communication interface 204 of secondary controller 200. Information and control signals may be passed bidirectionally between the two controllers using an appropriate communication protocol (BACnet, Modbus, LonWorks, Serial, etc.) and a communication layer suited to communication between the two controllers (Serial, Ethernet, ZigBee, WiFi, USB, RS-232, TTL, etc.). The controller 100 may act as the primary or master controller while the secondary controller 200 may act as the secondary or slave controller. Multiple secondary controllers may be connected to a single primary controller 100 to facilitate the control of large, distributed systems.

The primary controller 100 may be responsible for high level functionality such as data analysis, control, system sectioning, scheduling/timing/synchronization, and/or communications with the backend platform, by way of non-limiting example, while one or more secondary controllers 200 may be responsible for lower level functions such as sensor I/O, data processing (parsing, batching, low-level calculations, in-hardware calculations, etc.), and/or error detection, by way of non-limiting example. For example, if the control system of FIG. 2 is designed to collect voltage and current data from each heater or group of heaters in a heating system 120, the secondary controller(s) 200 may be responsible for reading raw voltages from various sensors (e.g. current transformers, voltage transducers, etc.) and performing high frequency calculations to obtain useful data (e.g. RMS voltage/current, average voltage/current, phase, frequency analysis, etc.) from these raw values. This processed data may be of significantly smaller size than the raw data, such that less information is transferred to the primary controller 100. Additionally, these calculations may be performed on specialized hardware in control circuitry 208, improving total processing speed and freeing up processor time in the primary controller 100.

If controller 100 is used exclusively for high level processes, the heating system interface 114 of controller 100 may not be connected directly to the heating system 120 and/or the sensor interface 112 may not be connected directly to external sensors 118.

A secondary controller 200 may contain some or all the components and functionality of a primary controller 100 depending on the overall system requirements. For example, a secondary controller 200 in the control system of FIG. 2 may only perform data collection and processing. In such a configuration, the secondary controller 200 does not communicate directly with the heating system 120 and therefore may not contain a heating system interface 202. The control circuitry 208 may perform initial calculations on the sensed data, then transmit the processed data to controller 100 via the communication interface 204. As another example, a secondary controller 200 in the control system of FIG. 2 may only perform heater switching functions. In such a configuration, the secondary controller 200 does not communicate directly with the external sensors 118 and therefore may not contain a sensor interface 206.

Such a distributed system containing primary and secondary controllers with specialized functionality may allow large systems to be controlled more effectively and efficiently at lower cost. For example, secondary controllers 200 may be placed closer to the heating system 120 and external sensors 118 than would be possible if only one central controller 100 was used. Placing the heating system interface 202 closer to heating system 120 may reduce the length of high voltage wiring and conduit, thereby reducing system cost. Similarly, placing sensor interface 206 closer to external sensors 118 may reduce the length of low voltage wiring and conduit, thereby reducing cost and electrical noise.

The control system of FIG. 2 may use a supervisory control and data acquisition (SCADA) model or a distributed control system (DCS) model as a basis for system architecture.

Figure 3:
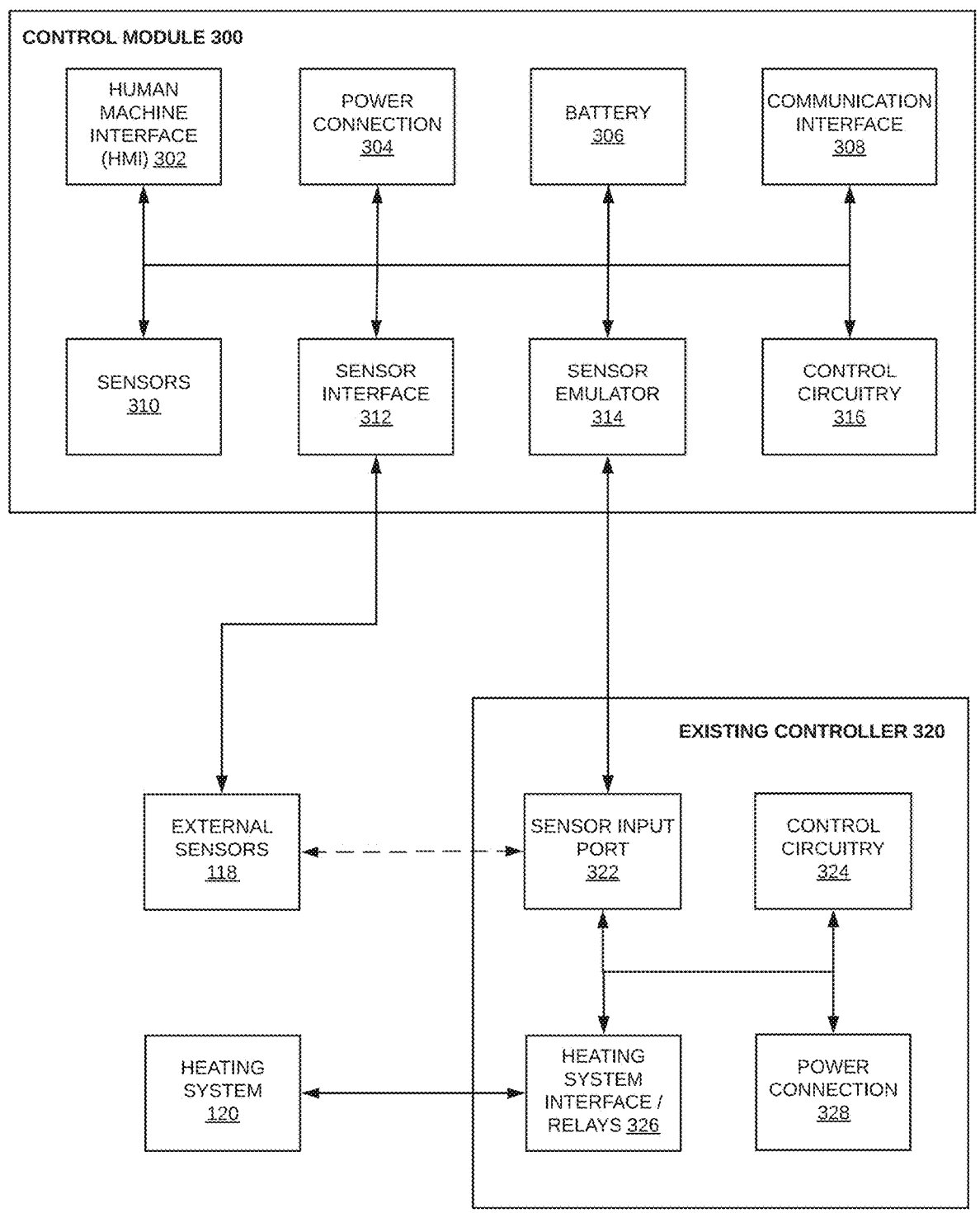
FIG. 3 illustrates an example of an intelligent, network-connected control module that may add functionality to an existing controller.

FIG. 3—Control Module

FIG. 3 illustrates another embodiment of an intelligent, network-connected control system. In this embodiment, a control module 300 is used to add network connectivity and additional functionality to an existing controller 320. In many situations it may be beneficial to connect legacy devices such as the existing controller 320 to a network without replacing all or some of the devices components. For example, the cost of replacing ground fault circuit interrupt (GFCI), power conversion, and/or switching components in existing controller 320, by way of non-limiting example, may negate the benefits (i.e. network connectivity, analytics, etc.) gained by replacing the entire legacy control unit 320 with a controller 100. In such a situation, it may be beneficial to utilize these existing components while adding functionality using a retrofit module such as control module 300.

The control module 300 can include a human-machine interface 302, a power supply (e.g. including a power connection 304 and/or a battery 306), a communication interface 308, one or more sensors 310, a sensor interface 312, and control circuitry 316 such as those of controller 100, as well as a sensor emulator 314. External sensors 118 may be connected to the control module 300 via the sensor interface 312.

The existing controller 320 can include a sensor input port 322, a heating system interface 326, control circuitry 324, a power connection 328, and other components specific to that model of controller. The heating system interface 326 is connected to the heating system 120.

If the existing controller 320 contains a physical communication port (e.g. Serial, Ethernet, USB, RS-232, TTL, etc.), it may be utilized to send instructions/data unidirectionally or bidirectionally between the communication interface 308 of control module 300 and the existing controller 320 using any protocol supported by the existing controller (BACnet, Modbus, LonWorks, etc.). In doing so the existing controller 320 may be connected to a network without running long passes of low-voltage wiring and conduit back to a central control unit, router, or computer, while simplifying integration with the control system described herein.

When the existing controller 320 does not contain a communication port, the control module 300 may control the existing controller by emulating certain sensor or switching signals of known functionality in the sensor emulator 314. For example, an existing controller 320 may contain a mechanical override input that allows a system operator to manually switch the system on and off using a remote physical switch. The sensor emulator 314 of control module 300 may contain a switch or contact with similar dynamics that can trigger the manual override of existing controller 320 according to control circuitry 316. When the switch/contact in sensor emulator 314 changes state, the control circuitry 324 in existing controller 320 sends a control signal to the heating system interface 326, thereby activating or de-activating the heating system 120.

Similarly, the sensor input 322 of existing controller 320 may be connected to an external sensor 118 that causes control circuitry 324 to activate heating system 120 when the sensor detects the presence of snow/ice, temperature change, or some other measured state that requires activation of heating system 120. Depending on the make/model of external sensor 118, the sensor may use voltage drop, resistance change, current change, switch activation, or any other applicable method to communicate with the sensor input port 322 of existing controller 320. The nature of the control signal of sensor 118 can be communicated by the manufacturer of snow sensor 118 or may be discerned in the laboratory. The sensor emulator 314 may be designed to mimic this communication method using applicable software, firmware, and/or hardware, and can take the place of the external sensor 118.

For example, the existing controller 320 may be connected to an external thermistor whose resistance varies with ambient temperature. When the resistance of the thermistor drops below a certain threshold, corresponding to some ambient temperature, the existing controller may be programmed to activate the heating system for snow/ice melting or freeze protection. When the resistance of the thermistor rises above the threshold, the existing controller will deactivate the heating system. If the sensor emulator 314 contains circuitry such as a digital potentiometer, an array of relays/switches and resistors, or some other means of mimicking the response of a thermistor, this behavior can be used to 'trick' the existing controller into turning on/off when the control module 300 deems necessary, according to a control algorithm described herein.

As another example, the existing controller 320 may be connected to a snow/ice sensor that outputs some voltage (e.g. +24 VDC) when dry and another voltage (e.g. 0 VDC) when snow/ice is present. The sensor emulator 314 may contain hardware capable of outputting these voltage levels, such that the existing controller can be 'tricked' into turning on/off when the control module 300 deems necessary, according to a control algorithm described herein.

Control module 300 can be connected to the sensor input port 322 of existing controller 320 via the sensor emulator 314 using a wiring method compatible with the mimicked external sensor(s) 118. The external sensor(s) 118 may be disconnected from the sensor input port 322 to make room for the connection to control module 300 and to ensure that existing controller 320 does not receive any direct signals from the external sensor(s) 118 that may interfere with the signals from the sensor emulator 314. The external sensor(s) 118 may then be connected to the sensor interface 312 of control module 300. By doing so, information from the external sensor(s) 118 may be used by the control algorithm of control module 300 and/or may be transmitted to a server such that the sensor data may be used by other parts of the networked control system, stored in a database, etc.

The control module 300 may include additional sensor I/O so that sensors of any type described above may be added to the control system. For example, I/O may be included that allows clamp-on current sensors and/or voltage probes/sensors to be attached to the power inputs or outputs of existing controller 320 for power monitoring and/or temperature sensing as described herein.

If power connection 304 and power connection 328 are connected in parallel to the same electrical circuit (e.g. wall power), the voltage sensed by an internal voltage sensor 310 in control module 300 may be used as a proxy for the voltage input to existing controller 320.

Current and voltage monitoring may also be accomplished by running the power supply to existing controller 320 through the power connection 304 of control module 300 such that internal sensors 310 may be used for power sensing. The power connection 304 may include both an input and output port such that control module 300 can receive power and internal sensors 310 can measure the voltage and/or current output to the power connection 328 of existing controller 320.

If a system exists that requires the networking of existing legacy controllers as well as the addition of one or more new controllers (e.g. to control additional circuits in the heating system), controller 100 may include a sensor emulator such that controller 100 gains the functionality of control module 300 described above.

A control module 300 may be used to add network connectivity and additional functionality to an existing controller 320, where controller 320 is a system not mentioned herein, e.g. legacy air conditioners, garage door openers, boilers, pumps, etc. Any device or controller that operates according to an external sensor input may be retrofitted by replacing the external sensor with control module 300.

Figure 4:
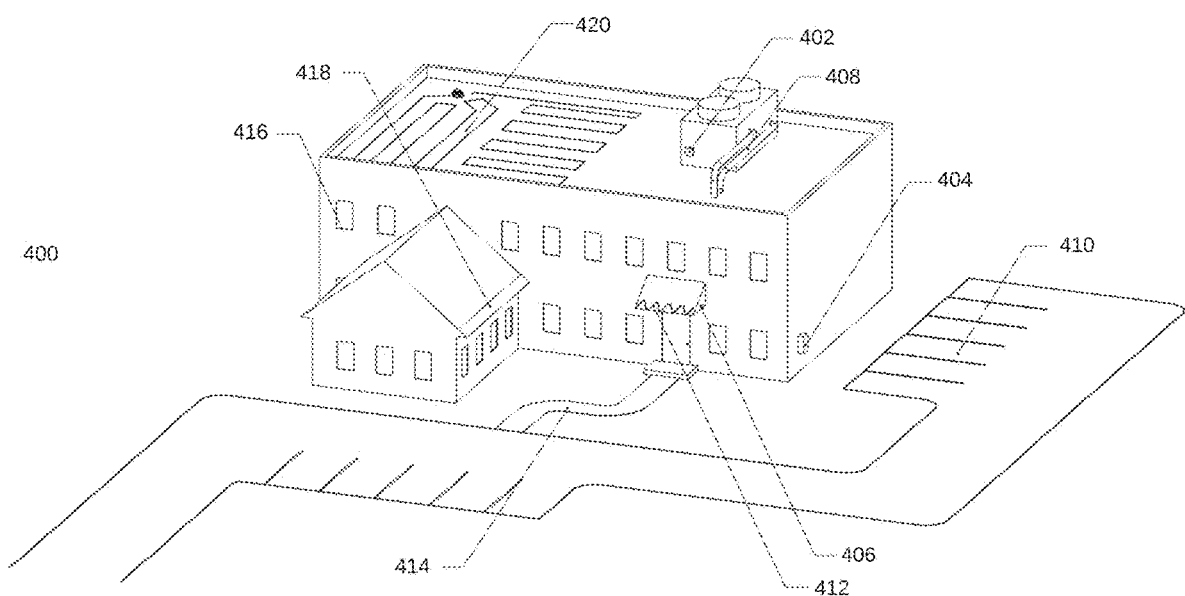
FIG. 4 illustrates an example of a smart building environment within which one or more of the devices, methods, systems, and/or services described further herein can be applied.

FIG. 4—Building with Multiple Heat Trace Systems

FIG. 4 illustrates an example of a smart building environment 400 where one or more of the devices, methods, systems, and or/services described herein can be applicable. The smart building 400 may be representative of any structure, e.g. a home, an apartment complex, a commercial building, a skyscraper, a shed, an oil rig, a bridge, etc. The depicted smart building 400 includes several heating systems that are exemplary embodiments of a heating system 120. Each heating system of smart building 400 may have different legal/code requirements, reliability requirements, system parameters, and/or functions, such that they require different control methods. FIG. 4 serves to illustrate different uses and functionality of controllers and/or control modules described herein.

A driveway/parking lot heating system 410 may consist of a hydronic or electric heat trace embedded in pavement. Such a system will have high thermal mass and may require pre-heating prior to the beginning of a snow/ice event to remain clear of snow/ice. If the heating system 410 is sufficiently large, it may consist of several heating circuits that may be controlled separately or together, depending on system parameters. For example, one heating circuit of heating system 410 may be embedded in a sloped section of pavement, such that meltwater drains quickly, while another heating circuit of heating system 410 may be embedded in a flat section of pavement with poor drainage. The sloped circuit may melt snow more quickly and can therefore be controlled differently than the flat circuit to increase overall system efficiency.

A walkway or sidewalk heating system 414 may consist of hydronic or electric heat trace embedded in pavement. Alternatively, heating mats may be laid on top of a walkway to provide temporary/removeable snow melting. The walkway heating system 414 may have a higher reliability requirement (for pedestrian safety) than, say, a driveway heating system 410, such that it must be run for a longer time.

A roof eave heating system 418 may consist of heat trace embedded in a metal extrusion, thick film heaters adhered to sheet metal, loose heat trace attached to the roof, or heaters embedded directly in the roof structure. If a heating system 418 is sufficiently sloped, the system may be able to shed snow by melting only a small interfacial layer of snow/ice. The heating system 418 may also be run as a melting or anti-icing system. A roof eave heating system 418 may be installed on several sections of roof and may consist of several heating circuits that can be controlled separately or together. For example, one roof section may face north and receive little solar irradiation, while another roof section may face south and receive more solar irradiation. The south and north facing systems may melt snow at different rates due to the additional solar energy input and may therefore be controlled differently to increase overall system efficiency.

A window heating system 416 may consist of a pane of glass (coated with indium tin oxide (ITO) or a conductive mesh) and/or heaters embedded in the window mullions. The heating system 416 may prevent condensation on the window surface. Different window heating systems 416 may be controlled differently depending on direction, exposure, dew point, humidity, etc.

An entry canopy heating system 412 may consist of loose heat trace that creates drainage paths in snow to prevent ice dams. The control of a heating system 412 may account for ice dam formation dynamics, snow tunneling effects, etc.

A rooftop heating system 420 may consist of loose heat trace or heat trace embedded in a metal extrusion that melts snow to reduce loads on the roof. If the roof is sufficiently large, the heating system 420 may consist of several heating circuits that may be controlled separately or together. Building requirements may stipulate that heating circuits in the gutters or drainage paths should always be on for a set of ambient conditions while circuits on flat portions of the roof may be controlled differently, i.e. at higher efficiency.

A pipe heating system 408 may provide freeze protection for water pipes, cooling towers, and/or other structures. A heating system 408 may be controlled differently from snow mitigation heating systems. For example, a heating system 408 may monitor or control for pipe or fluid temperature as opposed to surface temperature. A heating system 408 may be controlled according to ambient conditions, but may not rely heavily on, e.g., precipitation data.

Devices 402, 404, and 406 may be configured separately or together to control the heating systems of smart building 400. For example, device 402 may be a controller 100 that controls a multi-circuit heating system 408 while device 406 may be a controller 100 that controls a single-circuit heating system 412. Device 402 and device 404 may function separately, such that they communicate with a control network independently. Alternatively, devices 402 and 404 may communicate independently with a control network but are treated as one system by a cloud platform, as described herein, to e.g. aggregate data, control total instantaneous electrical consumption, etc.

As another example, device 402 may be a primary controller 100, while devices 404 and 406 are secondary controllers 200 in communication with device 402. Device 404 may control heating systems 408, 418, and 420 while device 406 may control heating systems 410 and 414. Device 402 communicates with the control network and relays information to/from devices 404 and 406, while devices 404 and 406 perform low-level data processing and switching. Local communications may occur via wired or wireless connections as described herein.

When a controller or group/network of controllers are responsible for control of one or more heating systems associated with the same smart building 400 or electrical circuit, considerations may be made for total energy consumption. Capacity may be limited, for example, by electrical circuit breakers, electrical wiring, supply to the building, or other constraints. Therefore, the controllers may control the heating system circuit(s) such that some instantaneous power consumption limit is not exceeded by activating only certain systems (or parts of a system) at any given time and/or reducing the power supply to certain systems. Additionally, high risk or high priority sections/circuits may be prioritized, run at higher power, etc.

Principles (e.g. multi-circuit control, differing requirements, et.) described in the context of one heating system or controller of smart building 400 may similarly apply to other heating systems or controllers. Heating systems may exist that are not associated with a smart building 400, for example heating systems for sidewalks, runways, roads, bridge decks, helicopter pads, etc.

Figure 5:
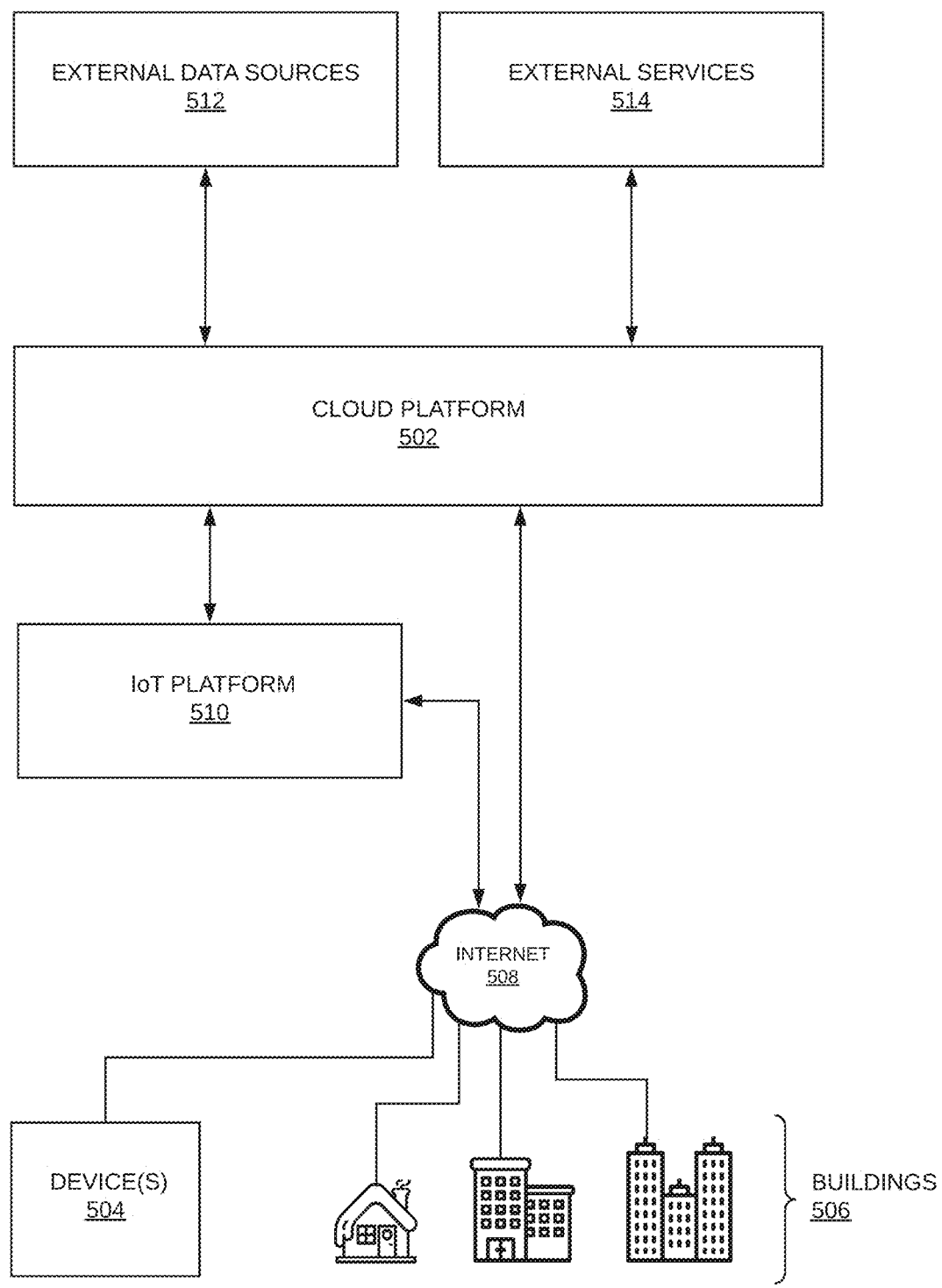
FIG. 5 illustrates a simplified view of a networked control system.

FIG. 5—Controller/Sensor Network

FIG. 5 illustrates a simplified diagram of a control network. Independent devices 504 and devices associated with buildings 506 and/or heating system(s) of buildings 506 are connected to the Internet 508 either directly (e.g. over 3G/4G, through a router and/or modem, etc.) or through a hubbed network. For example, multiple devices associated with a building 506 may connect to the Internet 508 through one building control node, hub, router, etc. Independent devices may be existing networked (i.e. IoT or smart home) devices that are not associated with a building and/or heating system.

Once connected to the Internet 508, devices communicate with cloud platform 502 directly or through an IoT platform 510, for example, an existing third party IoT Platform that communicates with cloud platform 502 via HTTPS, pub/sub, webhooks, or other means.

The cloud platform 502 may communicate with external data sources 512 and external services 514. The cloud platform 502 performs analysis, data storage, control, user interface, and other functions described herein.

FIG. 6—Heating Systems

FIG. 6 illustrates an embodiment of heating system 120 where a heater 608 is affixed to side 614 of surface 606. Heat transfers by conduction across interface 614 into surface 606. If a layer of snow/ice 602 is present, heat will then transfer across interface 612 into the interfacial layer 604 which will in turn heat the layer of snow/ice 602. If no snow/ice layer 602 is present, heat will transfer directly into the ambient air. Insulation 610 may be affixed to heater 608 to reduce heat losses from the back side of the heater. This embodiment provides heat transfer to surface 606 and interfacial layer 612 while protecting the heater 608 from exposure to ambient conditions, preventing heater damage and preserving aesthetic qualities of surface 606. For example, one or more silicone heaters may be vulcanized or adhered to the interior surface of a piece of cladding within a curtainwall assembly for snow mitigation. As another example, heat trace may be taped or clipped to the underside of a metal staircase for snow melting. As another example, a layer of Indium Tin Oxide (ITO) or a conductive mesh may be applied to a pane of glass (and covered with a dielectric layer) for snow mitigation or condensation prevention.

Figure 6A:
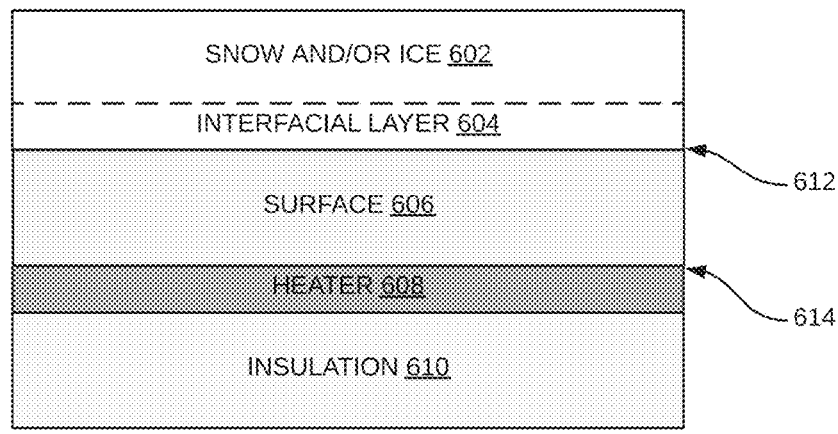
FIGS. 6A-6C illustrate exemplary embodiments of a heating system that may be controlled by an intelligent, network-connected controller.
Figure 6B:
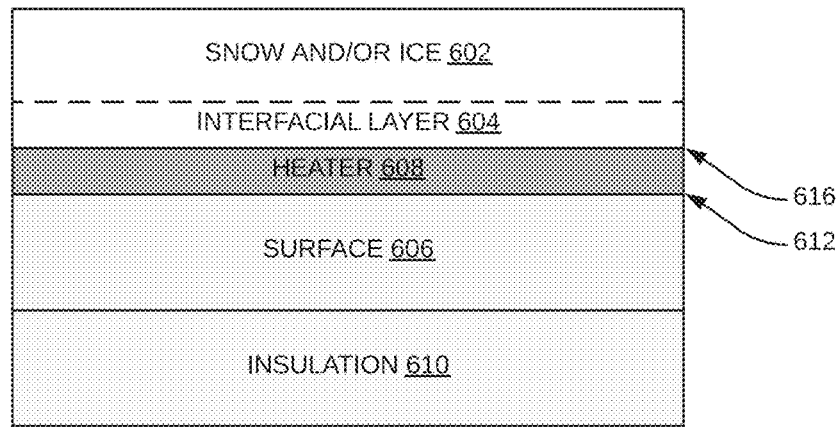

FIG. 6B illustrates an embodiment of heating system 120 where a heater 608 is affixed to side 612 of surface 606. Heat transfers directly across interface 616 into the interfacial layer 604 which in turn heats the layer of snow/ice 602. If no snow/ice layer 602 is present, heat will transfer directly into the ambient air. In this embodiment, de-icing and/or melting time may be reduced because heat transfers directly to the interfacial layer 604 and does not have to transfer through surface 606. Some heat will transfer across interface 612 into the surface 606. In many cases this heat loss is undesirable, so an insulation layer 610 may be affixed to the back side of surface 606. For example, heat trace may be placed on an insulated roof for snow melting. In some cases, for example where no insulation 610 is present and surface 606 is the outer surface of a water pipe, heat transfer into surface 606 is desirable, i.e. for freeze protection. In such an example, insulation may be placed at interface 616 to prevent heat loss from the system of heater 608 and surface 606.

Figure 6C:
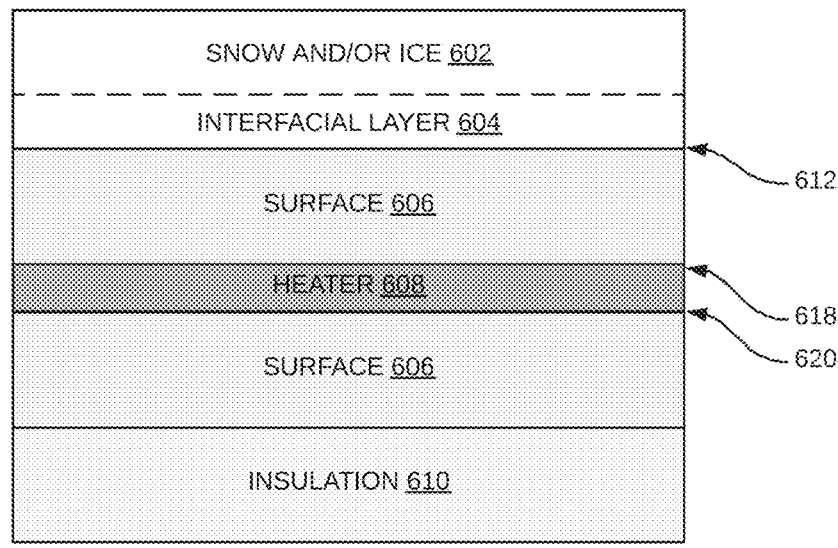

FIG. 6C illustrates an embodiment of heating system 120 where a heater 608 is embedded in surface 606. Heat transfers by conduction across interfaces 618 and 620 into surface 606. If a layer of snow/ice 602 is present, heat will then transfer across interface 612 into the interfacial layer 604 which will in turn heat the layer of snow/ice 602. If no snow/ice layer 602 is present, heat will transfer directly into the ambient air. Heat transfer across interface 618 may differ from heat transfer across interface 620 depending on constant factors (e.g. the composition of surface 606, the presence/composition of insulation 610) and/or variable factors (e.g. ambient conditions). For example, electric or hydronic heat trace may be embedded in concrete or pavement for snow melting in driveways, sidewalks, etc. As another example, heating elements may be embedded in a rubber mat for retrofittable stair or walkway snow melting.

Assemblies constructed for snow/ice mitigation may melt the snow on impact (anti-icing) or after an accretion has formed (melting). In some cases, where the surface is sufficiently sloped/angled such that accretions can slide off unimpeded (e.g. by snow pins, gutters, mullions, etc.), shedding may be induced. Shedding occurs when the interfacial layer of snow/ice 604 is melted, creating a melt-layer that reduces friction between surface 606 and snow/ice layer 602, thereby allowing external forces (e.g. wind, gravity) to remove the layer of snow/ice 602.

A heater 608 may be comprised of one or more heaters or heating elements connected in parallel or in series. Individual heating elements may be comprised of a resistive heating element and a substrate. The resistive heating element may be comprised of metal, graphite, a semi-conductor, a conductive ink, indium tin oxide (ITO), or another resistive material. A material may be used that has a positive or negative temperature coefficient of resistance (TCR) such that temperature of the heating element may be calculated by measuring the resistance of the heating element, as described herein. The substrate may consist of one or more materials, including silicone, polyimide, polyester, polyvinyl fluoride, Tedlar, fiberglass, ceramic, glass, or other suitable dielectric material. The heating element may be embedded within the substrate, placed on the substrate, and/or sandwiched between two layers of the substrate material, which may be held together by an adhesive, vulcanization, mechanical means, or other means.

A heater 608 may also be electric heat trace (self-regulating, constant wattage, etc.), hydronic or steam heat trace, infrared heating, any resistive material designed for generating heat, or other means of generating heat for the purposes discussed herein.

Metal (or another rigid material) may be used as a substrate if a dielectric layer is deposited or otherwise applied between the metal and heating element. In this case, the rigid substrate serves as both the surface 606 and the substrate of heater 608 and may have structural or architectural functions beyond that of a typical heater substrate. In such an embodiment, a heating element may be applied directly to a metal substrate by 3D printing, painting with a conductive paint, or through a coating process with or without masking. For example, Direct-Write Thermal Spray provided by MESOSCRIBE TECHNOLOGIES, INC. may be used to spray a resistive heating element onto a rigid substrate.

The surface 606 may be any surface or material that requires heating, freeze protection, snow/ice mitigation, condensation prevention, or the like. The surface 606 may be a standalone structure (e.g. pavement, concrete, a driveway, a sidewalk, etc.), a part of a building or enclosure (e.g. a roof, wall, awning, etc.), or some component of a larger structure (e.g. a curtainwall unit, a window, a paver tile, a bridge cable sheath, etc.). The surface 606 may consist of one uniform material or may be a composite or assembly of multiple materials or pieces of the same material. In some cases, where it is not possible to place the heater 608 directly under, on, or within the target surface, the heater may be placed adjacent to the target surface such that sufficient heat may transfer by conduction to the target surface.

In general, the assemblies of FIG. 6A, FIG. 6B, and FIG. 6C may be designed/constructed to advantageously distribute heat. For example, heat trace or resistance wire may be embedded within a metal extrusion to distribute heat between the heating elements for snow melting. For example, a wire-wound silicone heater adhered to an aluminum plate will result in even temperature distribution across the surface of the plate. This will result in even melting of snow. As another example, heat trace placed on a roof with some space (approximately 6 inches or more) between passes of heat trace will melt snow unevenly; heat may not conduct across the surface between the heat trace, resulting in unmelted regions. If such a system is covered in snow, tunnels may form in the snow/ice layer around the heat trace. The response of a tunneled system will differ from that of a system in free air or a system in direct contact with snow/ice. This response may be modelled or learned by a controller and/or control network as described herein. Each assembly will have physical properties that affect system dynamics. Variables relating to these properties may be input to a control system by a user or installer or learned by the control system as described herein.

Temperature Sensing Using Power Data

Those skilled in the art of thermodynamics will appreciate that most materials (e.g. heating elements) have a positive or negative temperature coefficient of resistance (TCR), such that the resistivity of the material changes with temperature. For a resistance, R, that changes by dR when the temperature T changes by dT, the temperature coefficient $\alpha$ is defined by the equation:

$$\frac{dR}{R} = \alpha dT$$

If the temperature coefficient is approximately linear with temperature in a given temperature range, then the following linear approximation is useful in that temperature range:

$$R_T = R_0(1 + \alpha(T - T_0))$$

Where $R_T$ is the resistance at temperature T and $R_0$ is the resistance as a reference temperature $T_0$. Resistance may be calculated by measuring the current, I, and voltage, V, across the material and using the equation R=V/I. Current and voltage may be measured across a material using any transducers, transformers, circuits, and/or sensors known in the art.

Solving for T:

$$T = \frac{R_T - R_0}{R_0 \alpha} + T_0 = \frac{V/I - R_0}{R_0 \alpha} + T_0$$

Where:

$$\alpha = \frac{R_T - R_0}{R_0(T - T_0)}$$

When the equations above are applied to a heating system such as those described herein, additional factors may be taken into consideration. The heater may be connected to the power source and/or sensing apparatus by non-heating electrical wires, leads, terminals, circuit breakers, and/or other means of connecting electrical components. These circuit elements will add some resistance $R_C$ to the circuit that will not change with temperature of the heating element(s). Some compensation may be introduced to the equations above such that $R_T = R_{MT} - R_C$ and $R_0 = R_{M0} - R_C$, where $R_{MT}$ is the measured resistance at T and $R_{M0}$ is the measured resistance at $T_0$. Additional linear or nonlinear compensation factors may be introduced into the equations above to increase accuracy. Additionally, $\alpha$ may vary with T such that $\alpha$ can be replaced with the function $\alpha(T)$.

Other relationships between T and R, where R=V/I, may be determined theoretically and/or experimentally. For example, the relationship between T and R may be represented by the polynomial:

$$T = AR^2 + BR + C$$

where A, B, and C are constants. Alternatively, some higher or lower order polynomial or some non-polynomial function may be used.

The above relationships will vary depending on the composition of the heating element or group of heating elements. Note that the temperature T obtained using this method is an average temperature across the heating element or group of heating elements. Heater temperature T (the observed variable) will relate to surface temperature (the latent variable) by a model or set of equations based on system parameters.

Figure 7:
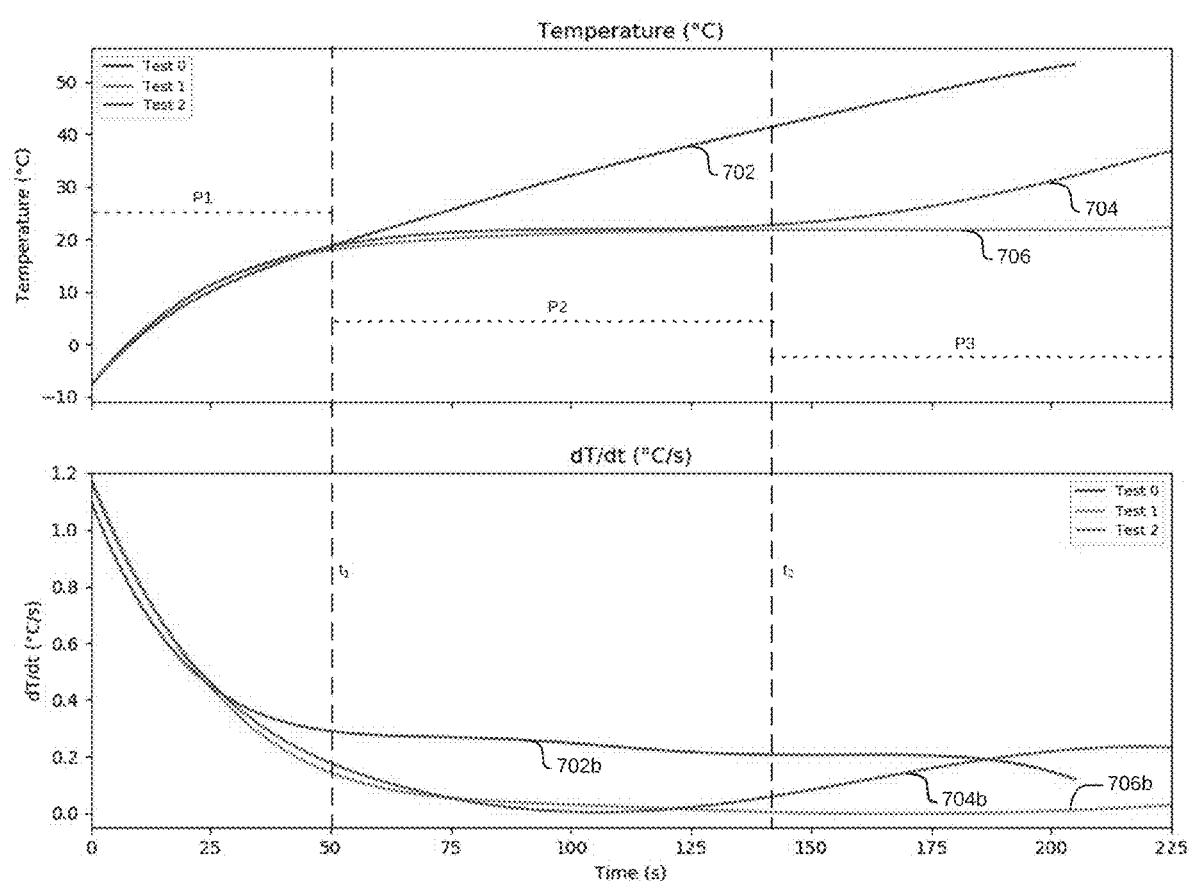
FIG. 7 illustrates the temperature response of an exemplary heating system with different snow melting/shedding conditions.

FIG. 7—Snow Presence and Release Sensing

Snow sensing can be performed with a point temperature sensor (i.e. RTD, thermistor, etc.) or by calculating average heater temperature as described above. Single point temperature sensing allows snow sensing only at the location of the sensor, while average temperature sensing allows sensing of the entire heated surface. In hydronic heating systems, a slab temperature sensor may be used for single point sensing, whereas average temperature may be calculated by monitoring temperature at various points such as the outlet and inlet of the fluid heater or boiler. In all systems, an array of temperature sensors may be used to approximate average surface/heater temperature using point sensors. Average temperature may also be calculated or sensed through other means, for example, by fiber optic temperature sensing methods.

FIG. 7 illustrates the temperature response of an exemplary heating system 120. Each temperature vs. time curve and its corresponding dT/dt vs. time curve represent different experimental trials performed on the same exemplary system, with different snow loads and release times. The top line 702 represents an exemplary response where no snow is present and serves as a baseline for comparison. The middle line 704 represents an exemplary response where the heated surface is initially fully covered with snow, then complete shedding occurs at approximately $t=t_2$. The bottom line 706 represents an exemplary response where the heated surface is initially fully covered with snow, and no shedding or complete melting occurs until t>225 s. Lines 702b, 704b, and 706b are the first derivatives dT/dt of the temperature responses 702, 704, and 706, respectively. Ambient conditions are constant for all exemplary responses.

Period P1 is the time between $t_0$ and $t_1$ where temperature rises rapidly and little to no melting occurs. During period P1 heating energy goes predominantly into heating the structure though conduction, as the system is not at steady state.

Period P2 is the time between $t_1$ and $t_2$ where melting is the dominant regime for responses 704 and 706. Snow/ice undergoes phase change from solid to liquid at 0° C., so additional heat energy input after surface temperature reaches approximately 0° C. goes into latent heat of fusion rather than heating. This creates a steady state temperature gradient ΔT across the heated surface, such that heater temperature T remains relatively constant during P2. No snow/ice is present for response 702 so temperature T continues to rise, but with increasing heat loss to convection.

Period P3 is the time between $t_2$ and $t_{max}$. The surface of response 704 becomes clear of snow/ice at approximately $t=t_2$ so the heater temperature begins to rise again as the surface temperature is no longer held constant at 0° C. The heating rate 704b begins to resemble that of the baseline response 702b as $t \to t_{max}$ where $T_{704}=T_{702}$. The surface of response 706 remains covered in snow/ice during P3 so no change in temperature is realized. Response 706b continues unchanged.

Several methods may be used to detect snow presence by analyzing the temperature response of a heating system 120. Generally, snow presence may be sensed by comparing temperature response to one or more 'baseline' responses, i.e. with known ambient conditions, snow coverage, etc. One method may involve comparing the initial temperature response during P1 to a known baseline response for a set of ambient conditions. For example, it is evident that snow-covered systems heat more quickly in this period, i.e. 704b and 706b (snow-covered) are greater than 702b (baseline) during the first half of P1.

Another method may involve comparing the temperature during P2 to a known baseline temperature for a set of ambient conditions. For example, it is evident that snow-covered systems are cooler in this period, i.e. 704 and 706 (snow-covered) are less than 702 (baseline) during P2. Similarly, it is evident that snow-covered systems exhibit a lower (near-zero) heating rate dT/dt in this period, as compared to uncovered systems, i.e. 704b and 706b (snow-covered) are less than 702b (baseline, uncovered) during the first half of P1.

Similarly, methods exist to detect the melting or shedding of snow by analyzing the temperature response of a heating system 120. One method may involve comparing the temperature response during P3 to the temperature response in P2. If the heating rate dT/dt falls to near zero during P2, then begins to rise (to the level of the baseline rate 702b during P2) in P3, snow melting or shedding has occurred at $t_2$. For example, 704b and 706b are nearly identical (near zero) during P2, but 704b (full shedding at $t_2$) rises towards the P2 level of 702b (baseline) during P3 while 706b (still fully covered) remains relatively constant (near zero) during P3.

Another method may involve comparing the temperature during P3 to the temperature during P2. If in P3 the temperature rises above or deviates from the (fairly constant) temperature during P2, snow melting or shedding has occurred at $t_2$. For example, 704 and 706 are nearly identical and constant through P2, but 704 begins to deviate from (rise above) 706 in P3.

Figure 8:
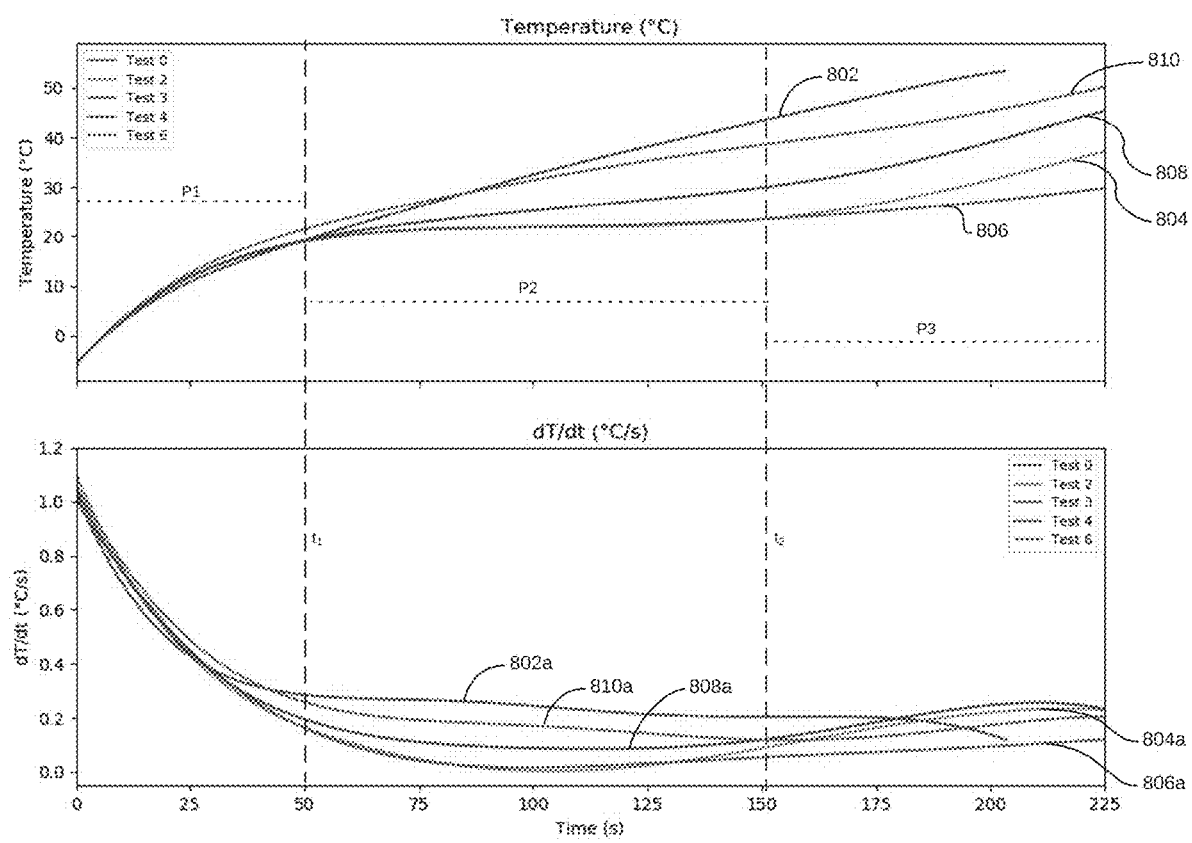
FIG. 8 illustrates the temperature response of an exemplary heating system with different snow coverage percentages and melting/shedding conditions.

FIG. 8—Percent Coverage and Percent Release

FIG. 8 illustrates temperature responses of an exemplary heating system. Each temperature vs. time curve and its corresponding dT/dt vs. time curve represent different experimental trials performed on the same exemplary system, with different snow loads and release times/amounts. Temperatures shown here are average temperatures of a heater 608 of a system like that described in FIG. 6A. The heater 608 spans the entire face 614 of surface 606.

The top line 802 represents an exemplary response where no snow is present and serves as a baseline for comparison. The line 804 represents an exemplary response where the heated surface is initially fully covered with snow, then complete shedding occurs at approximately $t=t_2$. The line 806 represents an exemplary response where the heated surface is initially fully covered with snow, then ½ the snow sheds at approximately $t=t_2$, leaving the surface ½ covered in snow during P3. The line 808 represents an exemplary response where the heated surface is initially ½ covered with snow, then complete shedding of the remaining snow occurs at approximately $t=t_2$. The line 810 represents an exemplary response where the heated surface is initially ¼ covered with snow, then complete shedding of the remaining snow occurs at approximately $t=t_2$. Lines 802a, 804a, 806a, 808a, and 810a are the first derivatives dT/dt of the temperature responses 802, 804, 806, 808, and 810 respectively. Ambient conditions are constant for all exemplary responses.

Period P1 is the time between $t_0$ and $t_1$ where temperature rises rapidly and little to no melting occurs. During period P1 heating energy goes predominantly into heating the structure though conduction, as the system is not at steady state.

Period P2 is the time between $t_1$ and $t_2$ where melting occurs in the snow-covered regions of the surfaces of responses 804, 806, 808, and 810. During P2, a steady state temperature gradient ΔT is created across the heated surface such that heater temperature T remains relatively constant, but only in the snow-covered regions. The temperature T continues to rise in the snow-free sections. Because the measured temperature T, and therefore dT/dt, is an average across the entire heater, i.e.:

$$\frac{dT}{dt} = \frac{dT_c}{dt}\left(\frac{A_c}{A_{total}}\right) + \frac{dT_u}{dt}\left(\frac{A_u}{A_{total}}\right)$$

Where $T_c$ is the average temperature of the covered area, $A_c$, and $T_u$ is the average temperature of the uncovered area, $A_u$. Hence, the rate of temperature change dT/dt of a surface will be decreased relative to the baseline rate dT/dt (assuming constant ambient conditions) by some factor relative to the snow coverage percentage. The exact decrease in rate may be determined experimentally or theoretically, accounting for specific system variables.

Period P3 is the time between $t_2$ and $t_{max}$. For surfaces where snow was removed at approximately $t=t_2$, the temperature T begins to rise again as the surface temperature is no longer held constant at 0° C. in the (previously) snow-covered regions. Surfaces where some snow is still present will heat at a slower rate, on average, than those that are completely clear. For example, the responses 804 and 806 (both surfaces completely snow-covered during P2) deviate in P3 due to the surface of response 804 being completely snow-free and the surface of response 806 being only ½ snow-free. This deviation is evidenced in the growing difference in temperature T and the gap between the rates 804a and 806a during P3.

Several methods may be used to detect the percentage of a surface covered by snow/ice by analyzing the temperature response of a heating system 120. Generally, snow percent coverage and release may be sensed by comparing temperature response to one or more 'baseline' responses, i.e. with known ambient conditions, snow coverage, release timing, etc. One method may involve comparing the temperature response during P2 to known responses for a set of ambient conditions. For example, it is evident that systems with less snow coverage heat more quickly in this period, i.e. 802a (baseline, no coverage) is greater than 810a (¼ coverage) which is greater than 808a (½ coverage) which is greater than 804b and 806b (full coverage) in P2. If a baseline response and/or other response(s) are collected where percent snow coverage is known (observed or sensed), the percent snow coverage during any other response may be calculated based on these known responses through comparative techniques.

Another method may involve comparing the temperature during P2 to the temperature of known responses for a set of ambient conditions. For example, it is evident that systems with less snow coverage have a higher temperature in P2, i.e. 802 (baseline, no coverage) is greater than 810 (¼ coverage) which is greater than 808 (½ coverage) which is greater than 804 and 806 (full coverage) in P2. If a baseline response and/or other response(s) are collected where snow coverage is known (observed or sensed), the percent snow coverage during any other response may be calculated based on these known responses.

Similarly, methods exist to detect the remaining percentage of snow coverage after a melting or shedding event by analyzing the temperature response of a heating system 120. One method may involve comparing the temperature response during P3 to known temperature responses for a set of ambient conditions after snow melting or shedding is detected using methods described above. For example, it is evident that systems with less snow coverage heat more quickly in this period, i.e. 804a, 808a, and 810a (no coverage in P3) rise to the level of the baseline response 802a during P2 (i.e. where $T_{802}=T_{804}$, $T_{802}=T_{808}$, etc.) while 806a (½ coverage in P3) rises proportionally less.

Another method may involve comparing the temperature during P3 to the temperature of known responses for a set of ambient conditions. For example, it is evident that systems with less snow coverage have a higher temperature in P3 as compared to systems with similar snow coverage in P2, i.e. 804 (no coverage in P3) is greater than 806 (½ coverage in P3) in P3 whereas both responses were almost identical in P2 where both systems were fully covered in snow.

Snow percent coverage and percent melting/shedding methods described above rely on average temperature across a surface, for example, average temperature calculations using voltage and current data. If point sensing is sufficiently granular as to approximate average sensing, the point data may be lumped and analyzed using methods associated with FIG. 8. Alternatively, methods associated with FIG. 7 may be applied to each point/node to sense percent snow coverage. Both methods can have similar outcomes.

While the system responses of FIG. 7 and FIG. 8 show temperature responses of a heating system 120, the response of other data or combinations of data may be used in the above sensing methods. For example, average temperature of a heater can be calculated as a mathematical function of voltage and current data for a heating system 120, as described above. So, other combinations of data may exhibit responses that may be compared (e.g. between P3 and P2, between a response and some baseline, etc.) to sense snow.

Threshold values, decision trees, if-then statements, and/or other algorithmic tools may be used to make the above comparisons for sensing of snow presence, percent coverage, melting/shedding, and percentage melting/shedding. Comparison methods may further take advantage of additional sensor data, weather data (e.g. from internet sources), additional derivatives or combinations of sensor data, system data, system/thermal modelling techniques, and/or other methods to improve snow sensing. For example, using heater temperature (e.g. heater temperatures shown in FIG. 7 and FIG. 8) and a system model to estimate/calculate a derived (i.e. not directly sensed) value (e.g. surface temperature), and then performing comparisons/analysis on the derived value may be beneficial.

A controller or network of controllers may use additional sensors (e.g. snow presence sensors) or visual methods (e.g. cameras) to confirm or validate the snow sensing methods described above to improve system models. For example, indexed sensor data and snow coverage amount and/or type data could be used by/in a model to detect snow presence and melting/shedding. Networked processes described herein may be used to derive or improve these comparisons.

Snow sensing methods described above may be used in conjunction with anti-icing methods described herein to sense snow dynamics on a shorter time scale, e.g. to determine if/when snow is present on a surface during anti-icing.

In the anti-icing case, voltage and current data are only accessible during the ON portion of an anti-icing duty cycle. Therefore, average temperature methods must be applied intermittently only during valid sections of data.

Anti-Icing with Weather Data

Convection and energy lost to latent heat of fusion are the dominant forms of heat loss for most thermal snow/ice melt systems at steady state, i.e. where $dT^2/d^2$ x=0 within the structure.

The latent heat of fusion, $Q_f$, required to melt incoming snow/ice is a function of the accumulation rate $a_s$, density $\rho_s$, and latent heat of fusion $l_s$, of snow/ice, such that:

$$Q_f = a_s \cdot l_f \rho_s$$

Accumulation rate and density vary depending on storm type and intensity.

Convective heat loss, $Q_C$, varies with surface temperature, $T_S$, ambient temperature, $T_A$, and the convection coefficient, $h(v_w)$, where h is a function of wind velocity, $v_w$, such that:

$$Q_C = h(v_w) \Delta T = h(v_w)(T_A - T_S)$$

Convection is the dominant form of heat loss and can be an order of magnitude greater than the latent heat of fusion. Losses to convection may be minimized for a given $v_w$ and $T_A$ by providing only enough heating power to maintain a surface temperature above the melting point of ice, such that heat transfers into incoming snow/ice and melts it. Heat input may be controlled by a control system described herein to maintain such a surface temperature. Maintaining a higher-than-necessary surface temperature wastes energy, i.e. input energy does not go into melting incoming snow/ice.

A surface with incident snow/ice will be held at approximately 0° C. (the melting point of ice) as melting occurs due to phase change properties of water. Therefore, a simple method of controlling a snow melt system may involve using a thermostat with a surface temperature setpoint slightly above 0° C. If all incoming snow is melted, the surface temperature will rise above the setpoint, stopping heat input. If incoming snow overpowers the maximum melting capacity of the heating system, surface temperature will be held around 0° C. (below the setpoint), such that the heating system remains powered on until all the snow is melted.

A controller may use weather data and a system model to calculate the appropriate heater power output necessary to melt incoming snow/ice efficiently for a set of ambient conditions. This model may account for heat losses beyond those to conduction and latent heat of fusion (e.g. energy required to keep meltwater from re-freezing) and/or account for systems not operating at steady state. Networking, learning, and feedback methods described herein may be used to improve control models for one or more control systems.

Most heating systems 120 are controlled by a relay, and therefore may only be controlled using on-off control. Therefore, altering the power output to a heater may involve implementing a duty cycle (i.e. a ratio of ON to OFF time), thus changing the average power output over some time. In some cases, it may be possible to alter the output voltage to a heating system 120, thus allowing more exact power control through feedback control, e.g. proportional, integral, PID control, etc. Cycling an SSR at high frequency (i.e. 0-60 Hz) may approximate voltage modulation through on-off control.

Intermittent de-icing involves allowing snow to build up to a certain level, then activating a heating system 120 to melt the snow. Snow sensing techniques described herein may be used to identify when melting is completed and the heating system 120 may be de-activated. Intermittent de-icing can be more efficient than anti-icing under certain ambient conditions, because heat loss to convection is reduced. A control system may choose to activate some or all sections of a heating system 120 in either anti-icing or de-icing (or a combination thereof) modes depending on ambient conditions, system type, etc.

Storm Intensity Sensing

Using principles described above, a heating system can be used to determine the intensity of a storm, i.e. the heat loss for a set of ambient conditions. If a heating system is controlled such that surface temperature is held at a known setpoint slightly above 0° C., the power output will vary as the ambient conditions (e.g. precipitation type, ambient temperature, wind speed) change. For a sufficiently short time frame, weather conditions can be assumed to be constant. Because temperature is held constant by the controller, $dT^2/d^2x=0$ within the heated surface, so $Q_{in}=Q_{out}$. Therefore, heat loss to the storm will approximately equal the power output of the heater. This relationship between input and output can be modelled more accurately by including additional knowledge of the system, e.g. thermal response, insulation, etc. The calculated storm intensity can be combined or compared with network weather data to increase understanding of how macro weather conditions affect local heat loss.

Storm intensity information sensed on one heating system or section of a heating system can be used by control algorithms that control other heating systems or other sections of the same heating system. Similar intensity sensing methods and associated control methods may be used for freeze protection systems, i.e. using ambient conditions and a system model to efficiently maintain a set temperature.

Figure 9:
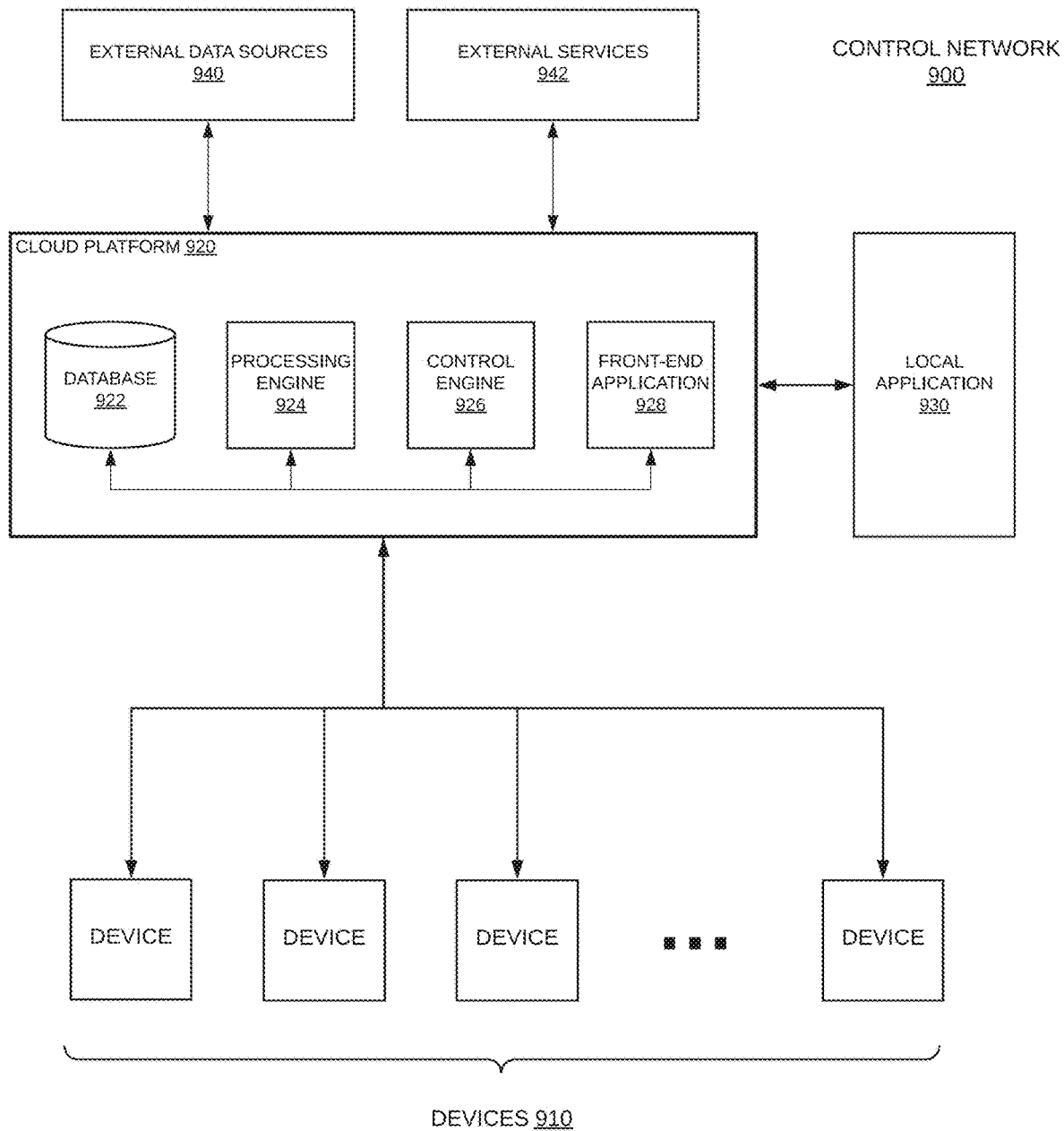
FIG. 9 illustrates an abstracted functional view of a device network and cloud processing platform.

FIG. 9—Networked Control

FIG. 9 illustrates an abstracted functional view of a device network and cloud processing platform. The entire network may be termed a control network 900.

Each of the devices 910 may transmit data (sensor readings, system information, status, errors, etc.) to the cloud platform 920 where the data is stored in a database 922. In some instances, a device may transmit data at a constant rate (e.g. every second, 30 seconds, 1 minute, 5 minutes, 1 hour, 24 hours, etc.) as determined by the device 910 or the processing engine 924. In some instances, the device 910 may transmit data at a variable rate, for instance when a certain criterion is met in the device. The data may include raw sensor measurements or processed sensor measurements. The data may also include a timestamp, a sampling frequency, and/or a device ID, by way of non-limiting example. Data corresponding to a device 910 in database 922 may also come from external sources, e.g. user input through front end application 928, satellite data, etc. A device 910 may be a controller 100, a secondary controller 200, a control module 300, or any other device, controller, sensor, or computer capable of connecting to the control network 900, including existing 'smart' devices such as, e.g., thermostats, weather stations, cameras, etc.

The database 922 may also store other data associated with a device, a user, a location, or another element of control network 900. In some instances, the database may store information regarding the heating system associated with device 910, e.g. location, heater type(s), heater size(s), power, manufacturer, install date, system type, etc. System information may be input by a user and/or installer, automatically populated with existing information (e.g. manufacturer specifications, government records, building plans, third party data, etc.) or acquired from a device sensor (e.g. GPS, altimeter, etc.). For example, the location of a device might be input by the user (geographical coordinates or street address), determined through the devices IP address or network information, or acquired by an on-device GPS sensor.

Users and/or installers may enter data using the device's human-machine interface, the front-end application 928, or a local application 930, e.g. a mobile application. In some instances, the database 922 may store user profile information such as telephone number, email, username, password, payment information, preferences, and/or associated device ID(s).

The processing engine 924 is responsible for analysis and processing within the cloud platform 920, for example data processing, statistical analysis, machine learning, API handling, etc. For example, the processing engine 924 may import weather data from one or more external data sources 940, analyze the data to see if snow/ice is predicted at any locations containing a device 910, then send a command signal to any affected device(s) 910 to activate the heating system at the appropriate time and power to sufficiently prevent or remove dangerous snow/ice accumulation. Information regarding this event may be stored in database 922 for future use. For example, for a heating system 120 where surface 606 is a large slab of concrete (i.e. a driveway) with high thermal mass—such that the surface takes a long time to heat to above freezing—the processing engine 924 may determine that device 910 should activate its associated heating system 120 some time, t, before the start of a storm, as predicted by weather data from an external source 940.

As another example, the processing engine 924 may determine that a heating system 120 does not need to activate during/after a certain storm because, e.g. the storm is sufficiently short, the storm will be followed by high temperatures and clear skies, the surface is already hot from previous high temperatures and solar irradiation, etc.

The processing engine 924 may run diagnostics and/or compare live data to historical data to, e.g., rule out erroneous sensor readings, determine system or sensor malfunctions, and/or determine the validity of weather data from external data sources 940.

The processing engine 924 may develop (through, e.g., statistical analysis, known system identification techniques, machine learning, etc.) a model that incorporates data values accessible by a device, group of devices, and/or the control network to calculate system response to some set of inputs and/or disturbances. This model may be used to, for example, calculate/estimate unknown values, determine optimal energy output, more accurately sense snow presence/release, and/or more efficiently activate/de-activate heating systems, e.g. when snow/ice is no longer present on the system. For example, such a model may be able to accurately estimate surface temperature of a heating system based on heater temperature. As another example, such a model may be used to find the optimal heater output power for a given set of weather conditions to mitigate snow/ice risks with minimal energy input.

Control may be implemented at the device level (e.g. by control circuitry 116) or at the cloud application level by control engine 926. For example, control engine 926 may determine that a device 910 should activate its associated heating system based on a dataset being processed at the cloud application level and will send a control signal to device 910 containing, for example, an ON/OFF signal and a power level (i.e. duty cycle) value.

As another example, a control algorithm developed at the cloud platform level for a specific device 910 may be pushed to the device 910 and stored in, e.g., control circuitry 116. The control circuitry 116 may then use data from sensors 110 and external sensors 120, as well as data (e.g. weather data) transmitted to the device from cloud platform 920 to control the heating system 118. In some cases, data from external data sources 940 may be imported directly by device 910 instead of passing through cloud platform 920.

When a sufficiently robust control algorithm, or any new control algorithm, has been developed at the cloud platform level 920, it may be implemented on a stand-along controller (not connected to the network), assuming the controller has sufficient sensor data to run such a control algorithm.

A control algorithm may only use data from its associated sensors to control a heating system. For example, a controller 910 may use voltage and current measurements to measure heater temperature and detect snow presence based on these values. The controller may perform a sensing process periodically, then remain on at some power output if snow/ice is detected, then turn off if complete snow/ice release/melting is sensed. Using this method, a controller may cycle through several heating sections, performing the sensing process at each section, heating where snow is sensed, and removing sections with no snow from the cycle. Adding additional sensor I/O, e.g. an ambient temperature sensor, may improve such a control algorithm.

A control algorithm may only use data from external data sources to control a heating system. For example, a controller 910 may use weather data from an online weather service to determine when to turn a heating system ON/OFF and at what power level. For example, when a weather service detects snow at the location of controller 910, the device can activate the heating system. When the weather service determines that snow/ice is no longer falling at that location, the device will deactivate the heating system. Some hold-on timer may be used to ensure that all snow/ice is removed before turning the heating system off. The hold-on timer could be a set value, determined by ambient conditions, or be calculated according to the response of similar/correlated systems.

Knowledge of systems with fewer sensors may be increased be leveraging outside inputs and external data sources 940. The cloud application may prompt a user to visually assess snow coverage on a system and input a response using the front-end application 928 or a local application 930. Additionally, imaging (video, photos, etc.) may be used to visually assess snow presence. This visual assessment may be used to determine if the system activated/deactivated the heating system at an effective or optimal time.

For example, a homeowner may have a controller 910 installed that controls a driveway snow melt system. The only input to the controller is weather data from an external data source. The initial control algorithm turns the snow melt system on when snow is forecast in the area, remains on during the snowstorm, then remains on for some hold-on time to ensure melting, before turning off. Before completion of the hold-on time, the system may prompt the user to visually assess if snow remains on the driveway. The users input can be used to shorten or lengthen the hold-on time as needed for different ambient conditions. In this way the system can determine system response characteristics without sufficient sensor inputs.

Algorithms and control methods may be pushed to devices 910 over a network or directly through the communication interface, for example, by inserting a USB device directly into device 910 or connecting device 910 to a computer via a communication cable. Similarly, data may be transferred from a device 910 to the cloud platform 920 over a network or directly through a hard-wired connection. Data may be transferred in real time or with some delay.

The cloud application may be integrated with external services 942 to provide benefit to both control network 900 and the external services 942. For example, snow presence data, as calculated by devices 910 within control network 900 may be transmitted to external weather services to improve resolution of their sensor networks and/or to validate their measured, forecasted, and/or estimated data.

As another example, cloud platform 900 may use pricing data from an electrical utility to decrease operational costs. For example, if electricity is currently expensive (e.g. during peak hours) and it is possible to delay snow melting until a later time (e.g. off-peak hours) or temporarily reduce power output without increasing risk or inconvenience beyond some acceptable threshold, the system may delay heater activation to save a user money. Similarly, the cloud platform 900 may delay heater activation and/or reduce power output in several networked devices at once as a part of a demand response program in partnership with an electrical utility.

As another example, the processing engine 924 may detect that a component of device 910 is broken or malfunctioning. The cloud platform 920 may automatically alert the user and schedule maintenance personnel to fix the device.

Front-end application 928 may receive user input from a user/installer or may display information to the user/installer. For example, an installer may access front-end application 928 through a web browser to input system parameters that can be used by processing engine 924 and/or control engine 926. The front-end application 928 may provide a user interface where the user can manually turn a heating system 120 on or off. The front-end application 928 may display system information (e.g. ambient conditions, electrical consumption) to the user. The front-end application 928 may provide an interface where the user can add or purchase additional services/functionality. For example, the user may enroll in a demand response program to reduce their energy bill. A local application 930 has the same functionality as a front-end application 928 but resides locally (e.g. as a mobile app, a desktop app, etc.) instead of on the cloud platform 920.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A system to mitigate snow and ice configured to sense a presence of snow or ice within a heating zone, the system comprising:
   one or more heating zones, each including one or more heaters:
   one or more controllers configured to:
     receive a power output of the one or more heaters of a heating zone;
     receive an average temperature of the one or more heating zones; and
     use the power output of the one or more heaters of the heating zone and the average temperature of the heating zone to determine whether snow or ice is present in the heated zone; and
     use the presence of the snow or ice determination to control the one or more heaters of the heating zone to achieve a specified result regarding snow or ice mitigation in the heating zone.

2. The system of claim 1, where the one or more heating zones, each including one or more heaters, are part of a hydronic heating system; and the one or more controllers are further configured to:
   determine an average temperature of a heating zone, where the average temperature of the heating zone is a weighted average of at least two temperature sensors in a heating loop of the hydronic heating system, and where a differential is used to establish a temperature gradient through the heating loop to determine the average temperature of the heating zone; and
   determine the power output of the heating zone by a measurement of energy imparted into a working fluid of the respective one or more heaters.

3. The system of claim 1, where:
   the one or more heaters, of the one or more heating zones, are part of a resistive heating system;
   where the power output of a heater is determined by:
     measuring a current and a voltage of the heater; and
     multiplying the current and the voltage to determine electric power consumed by the heater; and
   the one or more controllers are further configured to determine an effective power output of each heating zone over a period of time by a multiplication of the power output of the one or more heaters in the respective heating zone by the time the one or more heaters are on, during the period, and then by a division by a total time of the period.

4. The system of claim 1, where the one or more controllers further determine a measure of an intensity of a weather event by further being configured to:
   hold constant the average temperature of a heating zone, at some temperature above 0° C., sufficient to produce melting in the heating zone; and
   record the power output of the heater, such that the power output is considered a measurement of storm intensity;
   whereby the measurement of storm intensity may be combined with ambient weather information to account for non-precipitation heat loss factors (e.g., sun, wind, ambient temperature) to determine if melting is occurring, and if snow is present, in the zone.

5. The system of claim 1, where the one or more heaters are part of a resistive heating system; and the one or more controllers are further configured to a determine a resistance of a heater $R_H$ using the following equation:

$$R_H = \frac{V_H}{I_H}$$

where $I_H$ is a current of the heater and $V_H$ is a voltage of the heater, where the resistance of the heater $R_H$, which is proportional to temperature throughout an operating temperature range, is used as a proxy for the average temperature of a zone.

6. The system of claim 1, where the one or more controllers are further configured to use a system temperature response over time, at a constant power output sufficient to produce heating, to determine if a phase change of the snow or ice is occurring in the system by comparing the system temperature response over time to a baseline temperature response of the system with no snow or ice present, wherein a phase change indicates that snow or ice is present on a heating zone and is melting.

7. The system of claim 6, where the one or more controllers are further configured to use a first derivative of the system temperature response over time, together with one or more baseline tests, to determine a percentage of a zone covered by snow or ice.

8. The system of claim 6, where the one or more controllers are further configured to use a second derivative of the system temperature response over time to determine whether snow or ice is present in a zone and whether melting is complete.

9. The system of claim 6, where the one or more controllers are further configured to further use weather data to adjust the comparison of the system temperature response over time to the baseline temperature response of the system, the weather data accounting for non-precipitation related ambient conditions that affect the system temperature response over time, thereby increasing a likelihood of accuracy of the phase change determination.

10. The system of claim 1, where the one or more controllers are further configured to:
receive ambient weather information; and
use the ambient weather information to determine a measure of an intensity of a weather event, to adjust control parameters, and to change operational control of the one or more heaters according to the determined measure of the intensity of the weather event and according to operating characteristics of the one or more heaters.

11. The system of claim 10, where the one or more controllers are further configured to:
use forecasted ambient weather information to determine a predicted measure of an intensity of an upcoming weather event; and
use a baseline model of system heating behavior to preheat one or more heaters such that melting occurs in a respective zone at an onset of precipitation.

12. The system of claim 10, where the ambient weather information includes current storm precipitation totals; and wherein the one or more controllers are further configured to:
use ambient weather information during a duration of a storm to determine a forecasted total accumulated precipitation; and
use a baseline model of system behavior to determine a period of time, after the storm concludes, that one or more heaters will continue to operate, thereby more efficiently melting any remaining snow or ice on a zone after the storm concludes.

13. The system of claim 1, where multiple zones are controlled by a single central control system, comprising one or more controllers, the central control system configured to algorithmically and individually direct power to the one or more heaters in the multiple zones to limit total central control system heating power output, whereby the total central control system heating power output can be maintained below a predetermined total power capacity limit or can be operated at an algorithmically determined power output level factoring storm intensity and a predetermined efficiency factor.

14. The system of claim 1, where multiple zones are controlled by a single central control system, comprising one or more controllers, the central control system configured to:
determine whether snow or ice is present on any of the multiple zones;
direct heat to only zones where snow or ice is determined to be present; and
leave off any zone, previously determined to have snow or ice present, determined to not have snow or ice present thereon.

15. A method for controlling a snow or ice mitigation system, the system comprising:
one or more controllers communicating with a network, the one or more controllers configured to control one or more heaters of the system;
a processing engine associated with, and communicating with, the network, the processing engine configured to determine control parameters of the system;
the method comprising the steps of:
receiving, by the processing engine, weather data directed to a location associated with the system;
determining, by the processing engine, whether a storm with frozen precipitation intensity above a predetermined threshold is likely to occur in the location; and
determining, by the processing engine, control parameters for the one or more controllers, based upon the frozen precipitation intensity above a predetermined threshold determination, to achieve a specified result regarding snow or ice mitigation in the location.

16. The method of claim 15, further comprising the step of:
determining, by the processing engine, a measure of accuracy of the weather data directed to the location.

17. The method of claim 15, where the system further comprises sensors communicating with the one or more controllers, and the method further comprising the steps of:
receiving, by the processing engine, data from the sensors, including one or more sensors local to the location;
determining, by the processing engine, a measure of accuracy of the weather data directed to the location based upon data from the one or more local sensors; and
determining, by the processing engine, control parameters for the one or more controllers, based additionally upon the data from the sensors.

18. The method of claim 15, further comprising the steps of:
monitoring, by the processing engine, an intensity of a precipitation event throughout a duration of the precipitation event, using the weather data directed to the location;
receiving or determining, by the processing engine, a completion of the precipitation event;
determining, by the processing engine, a measure of total precipitation intensity for the completed precipitation event; and
determining, by the processing engine, based on a comparison of the measure of the total precipitation intensity for the completed precipitation event with known melting rates of the one or more heaters, a predetermined period of time, after the completion of the precipitation event, to continue operating the one or more heaters, thereby more efficiently melting any remaining snow or ice after the precipitation event ends.

19. The method of claim 15, further comprising the steps of:
- monitoring, by the processing engine, forecasted weather data directed to the location; and
- determining, by the processing engine, whether natural melting is likely to occur within an acceptable, predetermined interval of time after an end of a precipitation event, where an acceptable, predetermined interval of time considers location type, short term weather forecast directed to the location, and/or an anticipated schedule of use of the location; and
- delaying, shifting or preventing, by the processing engine, a timing of activation and/or deactivation of one or more heaters, depending upon the determining of a likelihood of natural melting and of the location type, the short term weather forecast directed to the location, and/or the anticipated schedule of use of the location.

20. A method for controlling a snow or ice mitigation system, the system comprising:
- one or more controllers communicating with a network, the one or more controllers configured to control one or more heaters of the system;
- sensors communicating with the one or more controllers; and
- a processing engine associated with, and communicating with, the network, where the network stores model data or historical data, and where the processing engine is configured to determine control parameters of the system;

the method comprising the steps of:
- receiving, by the processing engine, weather data directed to a location associated with the system;
- receiving, by the processing engine, data from the sensors, including one or more sensors local to the location, where data from the sensors local to the location includes current measurements;
- determining, by the processing engine, whether a storm with frozen precipitation intensity above a predetermined threshold is likely to occur in the location;
- determining, by the processing engine, control parameters for the one or more controllers, based upon the data from the sensors, and based upon the frozen precipitation intensity above a predetermined threshold determination, to achieve a specified result regarding snow or ice mitigation in the location;
- comparing, by the processing engine, the current measurements with the model data or the historical data;
- determining, by the processing engine, whether an operational state of the system is outside predetermined bounds by detecting, using the comparing, system faults, anomalies, or temporal changes.

21. A method for controlling a snow or ice mitigation system, the system comprising:
- one or more controllers communicating with a network, the one or more controllers configured to control one or more heaters of the system;
- a processing engine associated with, and communicating with, the network, the processing engine configured to determine control parameters of the system;

the method comprising the steps of:
- receiving, by the processing engine, weather data directed to a location associated with the system;
- determining, by the processing engine, whether a storm with frozen precipitation intensity above a predetermined threshold is likely to occur in the location;
- determining, by the processing engine, control parameters for the one or more controllers, based upon the frozen precipitation intensity above a predetermined threshold determination, to achieve a specified result regarding snow or ice mitigation in the location;
- storing or receiving pre-established heating response times for the one or more heaters of the system;
- monitoring, by the processing engine, forecasted weather data directed to the location to determine a measure of intensity of an upcoming storm; and
- initiating operation of one or more heaters of the system at a time before the upcoming storm begins, the time being sufficient to preheat the one or more heaters, wherein the system is heated at a rate sufficient to match the measure of intensity of the upcoming storm, and any accumulation of snow or ice can be prevented beginning at an onset of the upcoming storm.

22. A method for controlling a snow or ice mitigation system, the system comprising:
- one or more controllers communicating with a network, the one or more controllers configured to control one or more heaters of the system;
- a processing engine associated with, and communicating with, the network, where the network stores third party information such as real time electricity pricing or information from a grid operator, and where the processing engine is configured to determine control parameters of the system;

the method comprising the steps of:
- receiving, by the processing engine, weather data directed to a location associated with the system;
- determining, by the processing engine, whether a storm with frozen precipitation intensity above a predetermined threshold is likely to occur in the location;
- determining, by the processing engine, control parameters for the one or more controllers, based upon the frozen precipitation intensity above a predetermined threshold determination, to achieve a specified result regarding snow or ice mitigation in the location;
- monitoring and analyzing, by the processing engine, forecasted weather data directed to the location and the third party information; and
- delaying or shifting, by the processing engine, a timing of activation of one or more heaters, whereby performance of the system is efficiently optimized relative to the third party information.

23. A method for controlling a snow or ice mitigation system, the system comprising:
- one or more controllers, located at a system level, communicating with a network, the one or more controllers configured to control one or more heaters of the system;
- a processing engine located at a network level, communicating with the system, the processing engine configured to determine control parameters of the system;

the method comprising the steps of:
- receiving, by the processing engine, weather data directed to a location associated with the system together with information selected from the group consisting of model data, historical weather data of one or more locations, historical operational data of one or more systems, and historical operational data of one or more systems relative to respective historical weather data;
- analyzing, by the processing engine, the weather data together with the information to determine whether an upcoming weather event will likely produce frozen accumulation above a pre-determined threshold at the location;
- developing, by the processing engine, a control algorithm specific for the system based upon the analyzing; and transferring the control algorithm to the one or more controllers at the system level for use by the system, together with at least sensor data local to the system, to control, independent of the network level, the one or more heaters of the system.

24. A system to mitigate snow and ice configured to sense a presence of snow or ice within a heating zone, the system comprising:

one or more heating zones, each including one or more heaters:

one or more controllers configured to:

receive a power output of the one or more heaters of a heating zone;

receive an average temperature of the one or more heating zones; and use the power output of the one or more heaters of the heating zone and the average temperature of the heating zone to determine whether snow or ice is present in the heated zone.

* * * * *